United States Patent
Senjalia

(10) Patent No.: US 11,693,890 B2
(45) Date of Patent: Jul. 4, 2023

(54) METHODS AND APPARATUS FOR VISUALIZING ENTITY INSTANCE RELATIONSHIPS IN A DATABASE

(71) Applicant: Bhargav Senjalia, Mine Hill, NJ (US)

(72) Inventor: Bhargav Senjalia, Mine Hill, NJ (US)

(*) Notice: Subject to any disclaimer, the term of this patent is extended or adjusted under 35 U.S.C. 154(b) by 478 days.

(21) Appl. No.: 16/420,607

(22) Filed: May 23, 2019

(65) Prior Publication Data

US 2019/0278789 A1 Sep. 12, 2019

Related U.S. Application Data

(63) Continuation-in-part of application No. 15/494,261, filed on Apr. 21, 2017.

(60) Provisional application No. 62/675,403, filed on May 23, 2018, provisional application No. 62/327,197, filed on Apr. 25, 2016.

(51) Int. Cl.
| | |
|---|---|
| *G06F 16/28* | (2019.01) |
| *G06F 16/22* | (2019.01) |
| *G06F 3/0482* | (2013.01) |
| *G06F 3/04817* | (2022.01) |
| *G06F 16/26* | (2019.01) |

(52) U.S. Cl.
CPC .......... *G06F 16/288* (2019.01); *G06F 3/0482* (2013.01); *G06F 3/04817* (2013.01); *G06F 16/2282* (2019.01); *G06F 16/26* (2019.01); *G06F 16/287* (2019.01)

(58) Field of Classification Search
CPC .. G06F 16/288; G06F 16/2282; G06F 3/0482; G06F 16/287; G06F 3/04817; G06F 16/26
See application file for complete search history.

(56) References Cited

U.S. PATENT DOCUMENTS

| | | | |
|---|---|---|---|
| 8,917,274 B2 | 12/2014 | Ma et al. | |
| 2008/0270458 A1* | 10/2008 | Gvelesiani | G06F 16/288 |
| 2012/0059861 A1* | 3/2012 | Senjalia | G06F 16/9024 |
| | | | 707/E17.005 |
| 2012/0117516 A1* | 5/2012 | Guinness | G06F 16/211 |
| | | | 715/853 |
| 2012/0221553 A1* | 8/2012 | Wittmer | G06F 16/904 |
| | | | 707/E17.014 |
| 2014/0172850 A1 | 6/2014 | Borkar et al. | |
| 2014/0379703 A1 | 12/2014 | Martin et al. | |
| 2015/0347413 A1 | 12/2015 | Brady | |
| 2017/0308538 A1 | 10/2017 | Senjalia | |

OTHER PUBLICATIONS

Non-Final Office Action for U.S. Appl. No. 15/494,261, dated Jul. 31, 2020, 29 pages.
Advisory Action for U.S. Appl. No. 15/494,261, dated Nov. 6, 2019, 3 pages.
Applicant-Initiated Interview Summary for U.S. Appl. No. 15/494,261, dated Nov. 18, 2020, 6 pages.

(Continued)

*Primary Examiner* — Richard L Bowen
*Assistant Examiner* — Aryan D Toughiry
(74) *Attorney, Agent, or Firm* — Dority & Manning, P.A.

(57) ABSTRACT

A method, apparatus, and non-transitory computer-readable storage medium for generating and presenting information identifying relationships between entity instances in a database that has a plurality of entity structures.

20 Claims, 27 Drawing Sheets

(56) References Cited

OTHER PUBLICATIONS

Final Office Action for U.S. Appl. No. 15/494,261, dated Jan. 27, 2021, 34 pages.
Non-Final Office Action for U.S. Appl. No. 15/494,261, dated Mar. 20, 2019, 20 pages.
Examiner's Answer to Appeal Brief for U.S. Appl. No. 15/494,261, mailed Sep. 2, 2022, 8 pages.

* cited by examiner

| | 100 | 106 | 102-1 | 102-2 | 102-3 | 102-4 | 102-5 | 102-6 | 102-7 | 102-8 |
|---|---|---|---|---|---|---|---|---|---|---|
| CUSTOMER_ID | PRODUCT_ID | STORE_ID | CUSTOMER_NAME | PRODUCT_NAME | STORE_LOC | | | | | |
| C1 | P1 | S1 | BOB | TV | NORTH | | | | | |
| C2 | P1 | S2 | TINA | TV | SOUTH | | | | | |
| C3 | P2 | | JACK | PHONE | | | | | | |
| C4 | P3 | S3 | KIM | ROUTER | EAST | | | | | |
| | | S3 | TOM | | EAST | | | | | |
| C5 | P4 | S4 | | MODEM | WEST | | | | | |

| | 108 | 110-1 | 110-2 | 110-3 | 110-4 | 110-5 | 110-6 |
|---|---|---|---|---|---|---|---|
| ENTITY | ATTR_NAME | ATTR_TYPE | | | | | |
| CUSTOMER | CUSTOMER_ID | 1 | | | | | |
| CUSTOMER | CUSTOMER_NAME | 0 | | | | | |
| PRODUCT | PRODUCT_ID | 1 | | | | | |
| PRODUCT | PRODUCT_NAME | 0 | | | | | |
| STORE | STORE_ID | 1 | | | | | |
| STORE | STORE_LOC | 0 | | | | | |

CUSTOMER-STORE-PRODUCT (124)

| CUSTOMER | | PRODUCT | | STORE | | PRODUCT | | STORE | |
|---|---|---|---|---|---|---|---|---|---|
| CUSTOMER_ID | CUSTOMER_NAME | PRODUCT_ID | | STORE_ID | | PRODUCT_NAME | | STORE_LOC | |
| C1 | BOB | P1 | | S1 | | TV | | NORTH | |
| C2 | TINA | P1 | | S2 | | TV | | SOUTH | |

126-1, 126-2, 126-3, 126-4

CUSTOMER-PRODUCT (128)

| CUSTOMER | | PRODUCT | |
|---|---|---|---|
| CUSTOMER_ID | CUSTOMER_NAME | PRODUCT_ID | PRODUCT_NAME |
| C3 | JACK | P2 | PHONE |

130-1, 130-2, 130-3

STORE-PRODUCT (132)

| PRODUCT | | STORE | |
|---|---|---|---|
| PRODUCT_ID | PRODUCT_NAME | STORE_ID | STORE_LOC |
| P3 | ROUTER | S3 | EAST |

CUSTOMER-STORE (134)

| CUSTOMER | | STORE | |
|---|---|---|---|
| CUSTOMER_ID | CUSTOMER_NAME | STORE_ID | STORE_LOC |
| C4 | KIM | S3 | EAST |

*FIG. 17B*

PRODUCT

| PRODUCT | PRODUCT |
|---|---|
| PRODUCT_ID | PRODUCT_NAME |
| P4 | MODEM |

142-1, 142-2, 142-3 — 140

CUSTOMER

| CUSTOMER | CUSTOMER |
|---|---|
| CUSTOMER_ID | CUSTOMER_NAME |
| C5 | TOM |

146

STORE

| STORE | STORE |
|---|---|
| STORE_ID | STORE_LOC |
| S4 | WEST |

150

PRODUCT (TOTAL: 4)

| PRODUCT | PRODUCT |
|---|---|
| PRODUCT_ID | PRODUCT_NAME |
| P1 | TV |
| P2 | PHONE |
| P3 | ROUTER |
| P4 | MODEM |

138-1, 138-2, 138-3, 138-4, 138-5, 138-6 — 136

CUSTOMER (TOTAL: 5)

| CUSTOMER | CUSTOMER |
|---|---|
| CUSTOMER_ID | CUSTOMER_NAME |
| C1 | BOB |
| C2 | TINA |
| C3 | JACK |
| C4 | KIM |
| C5 | TOM |

144

STORE (TOTAL: 4)

| STORE | STORE |
|---|---|
| STORE_ID | STORE_LOC |
| S1 | NORTH |
| S2 | SOUTH |
| S3 | EAST |
| S4 | WEST |

SELECT A DATA TABLE
ERT-1 ▽ ~154

SELECT ENTITIES:
156-1 ☒ CUSTOMER
156-2 ☐ PRODUCT
156-3 ☐ STORE

RUN ~158

~152

~174

| CUSTOMER | CUSTOMER |
|---|---|
| CUSTOMER_ID | CUSTOMER_NAME |
| C1 | BOB |
| C2 | TINA |
| C3 | JACK |
| C4 | KIM |
| C5 | TOM |

CUSTOMER
~172
TOTAL: 5
~160

CLEAR SELECTION ~170

METHODS AND APPARATUS FOR
VISUALIZING ENTITY INSTANCE
RELATIONSHIPS IN A DATABASE

RELATED APPLICATIONS

This application is a continuation-in-part of co-pending U.S. patent application Ser. No. 15/494,261, filed on Apr. 21, 2017, entitled "METHODS AND APPARATUS FOR VISUALIZING ENTITY INSTANCE RELATIONSHIPS IN A DATABASE," which claims the benefit of U.S. Provisional Application No. 62/327,197, filed on Apr. 25, 2016, entitled "TOOL FOR PRESENTING ENTITY-RELATIONSHIP DATA IN THE FORM OF A DIAGRAM," the disclosures of each of which are hereby incorporated herein by reference in their entireties, and this application also claims the benefit of U.S. Provisional Application No. 62/675,403, filed on May 23, 2018, entitled "SYSTEM AND METHODS FOR PRESENTING ENTITY AND ENTITY-RELATIONSHIP DATA," the disclosure of which is hereby incorporated herein by reference in its entirety.

TECHNICAL FIELD

Embodiments disclosed herein relate to data analysis and, in particular, to visualizing entity instance relationships maintained in a database.

BACKGROUND

Databases are used to store information, and are frequently organized based on an abstraction referred to as an "entity." Each entity models, or represents, a thing that is relatively distinct from another thing. One example is a retailer database, which may be organized based at least in part on a customer entity used to model, or represent, customers of the retailer; a product entity used to model products carried by the retailer; a vendor entity used to model vendors of the retailer; and a store entity used to model various physical retail locations (stores) of the retailer. Each entity typically has a relationship with one or more other entities. Obvious relationships among the above entities might include a relationship between customers and products, e.g., certain customers purchased certain products, and a relationship between vendors and products, e.g., particular products are supplied by certain vendors.

An entity, such as a customer entity, also typically defines attributes which contain data that describe or otherwise relate to the thing being modeled. For example, a customer entity may have a name attribute, an address attribute, and the like. The collection of attribute data that describes the actual thing being modeled is referred to as an instance of the entity, or, for shorthand, an entity instance. There may be many entity instances of each type of entity. Using the above example, the retailer database may include thousands of entity instances of the customer entity type, each entity instance including attribute data associated with a particular customer of the retailer. Typically, each entity instance will include at least one attribute that uniquely identifies a particular entity instance of a particular entity type from every other entity instance of the same entity type. For example, each customer entity instance may include a unique identifier attribute that uniquely identifies a particular customer.

There are frequently relationships among entity instances of different entity types in a database, some of which may be relatively obvious, and some less so. For example, a particular customer entity instance has a relationship with a particular product entity instance if the customer represented by the customer entity instance purchased the product represented by the particular product entity instance. This information may be valuable to the retailer because it provides the retailer with potentially useful information about the customer, such as the fact that the customer may be a country music fan if the product is a country music CD. The particular product entity instance is also related to a particular store entity instance by virtue of the fact that the product was sold by a particular store of the retailer. Note that this latter relationship actually further establishes a relationship between the particular customer entity instance and the particular store entity instance in that the particular customer purchased the country music CD from the particular store. Knowing that the particular customer shops at a particular store may also be useful to the retailer. Consequently, it is not unusual for a database owner to want to know what relationships exist among the entity instances in a database.

Typically, when an individual wants a report identifying the entity instances which are related to one another, another individual—typically a person skilled in the particular database technology used to store the data—must develop a specialized program which extracts this information from the database that contains the entity instances. This can be a time-consuming and expensive process, and requires access to individuals with specialized database skills. Moreover, the resulting software is tailored to generating a report about particular entity types. If a different report that provides information about different entity types is desired, another specialized program must be developed. Often, such reports are textual and may present information in a manner that is not intuitive or easily interpreted by a human. Accordingly, there is a need for a mechanism that can provide information about relationships between entity instances in a database that does not require modification for each different desired report, and that visualizes information identifying the relationships between the entity instances in the database in a manner that is intuitive and easily interpreted by a human.

SUMMARY

Embodiments disclosed herein relate to visualizing information that identifies relationships between different types of things modeled, or represented, in a database. In one embodiment, a method is provided. The method includes accessing, by a computing device comprising a processor device, a relationship data structure comprising a plurality of relationship sets, at least some of the relationship sets comprising at least two unique entity instance identifiers, each relationship set of the at least some of the relationship sets corresponding to a type of relationship and identifying an existence of a relationship between a set of unique entity instances stored in a group of different entity structures of a database, each entity structure corresponding to a different entity type and comprising a plurality of entity instances of the corresponding entity type. The method further includes determining, based on a number N of different entity structures in the group of different entity structures, a number S of different types of relationships between at least two entity instances of the group of different entity structures. The method further includes generating a set of S relationship icons, each relationship icon corresponding to one of the number S of different types of relationships, each different type of relationship corresponding to a different subset of entity structures of the group of different entity structures.

The method further includes presenting a summary view on a display device, the summary view comprising the set of S relationship icons, by, based on the relationship data structure, for each respective type of relationship, presenting, on the display device, the relationship icon corresponding to the respective type of relationship and information that identifies the subset of entity structures that correspond to the respective type of relationship, determining a respective subset of relationship sets of the relationship data structure wherein the respective subset of relationship sets comprises only those relationship sets that identify a relationship between unique entity instances of the entity types of the subset of entity structures that corresponds to the respective type of relationship, for each entity structure in the subset of entity structures that corresponds to the respective type of relationship, determining a total number of unique entity instances of the entity type of the entity structure contained in the respective subset of relationship sets, and presenting, on the display device in association with the relationship icon corresponding to the respective type of relationship, for each entity structure in the subset of entity structures that corresponds to the respective type of relationship, the total number of unique entity instances of the entity type of the entity structure identified in the respective subset of relationship sets.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 13 illustrates a relationship data structure according to one embodiment;

FIG. 14 illustrates a relationship metadata table according to one embodiment;

FIGS. 17A-17C illustrate aspects of a detailed view of one or more relationship icons or entity structure icons that may be presented upon request;

FIG. 20 illustrates an example user interface and sequence of possible user input actions according to another embodiment.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first subset" and "second subset," and does not imply a priority, a type, an importance, or other attribute, unless otherwise stated herein.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Embodiments disclosed herein relate to visualizing information that identifies relationships between different types of things modeled, or represented, in a database. The embodiments result in an intuitive user interface that visually depicts relationships between entity instances of entity structures. For purposes of illustration, embodiments will be illustrated in the context of a relational database, but the embodiments are not limited to any particular form of database. As used herein, the term "database" refers to any data structure suitable for retaining information, such as a file, a spreadsheet, a database management system, or the like.

Figure 1:
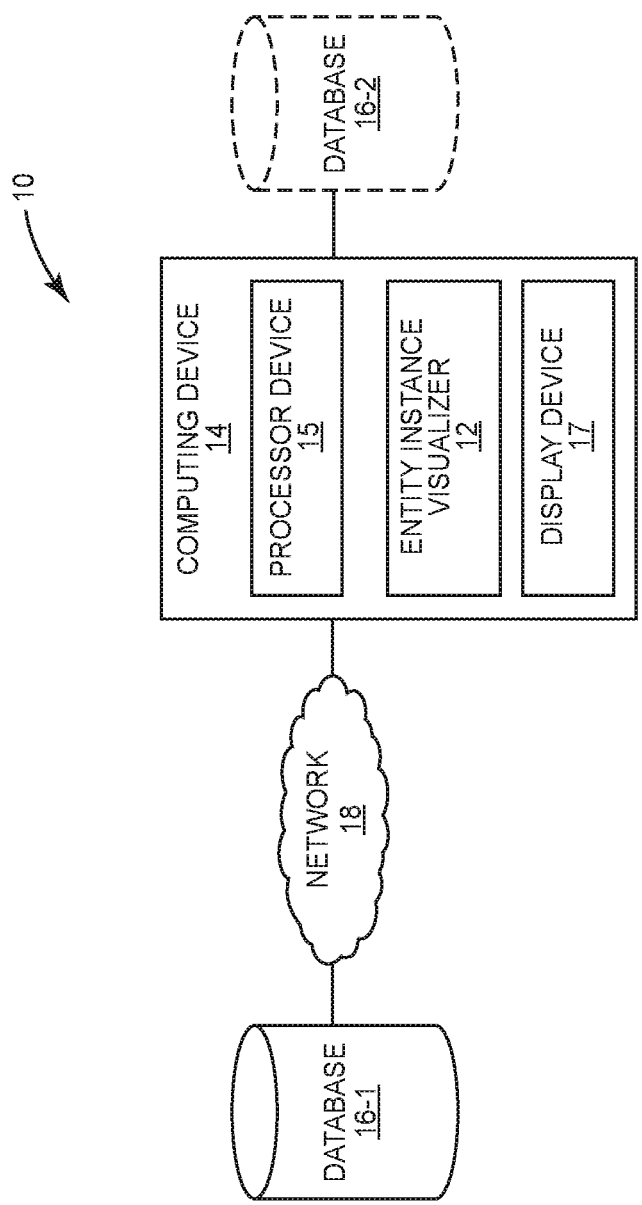
FIG. 1 is a block diagram of an example system in which embodiments may be practiced.

FIG. 1 is a block diagram of an example system 10 in which embodiments may be practiced. The system 10 includes an entity instance visualizer 12 that executes on a computing device 14, such as a computer. The computing device 14 includes a processor device 15 and a display device 17. In one embodiment, the entity instance visualizer 12 accesses information associated with a database 16-1 that is coupled to a network 18. Alternately, the entity instance visualizer 12 may access information associated with a locally connected database 16-2, as illustrated in dashed outline in FIG. 1.

Generally, as discussed in greater detail with reference to the subsequent figures, the entity instance visualizer 12 accesses information in a data table that identifies relationships between particular entity instances of the database 16-1, and based on this information, and in response to user input, presents information on the display device 17 that identifies relationships between entity instances of different entity types. The entity instance visualizer 12 can present such information based on any suitable data table, and need not be modified, altered, tested, debugged, or re-compiled to do so. Rather, in conjunction with the data table, the entity instance visualizer 12 provides a highly intuitive and flexible mechanism that enables a user to rapidly ascertain how information stored in the database 16-1 is related. Knowledge of such relationships may be used in any of a number of different applications, such as for advertising, marketing, or any other endeavor in which such knowledge would be useful. Because the entity instance visualizer 12 is a component of the computing device 14, functionality implemented by the entity instance visualizer 12 may be attributed to the computing device 14 generally. Moreover, in examples where the entity instance visualizer 12 comprises software instructions that program the processor device 15 to carry out functionality discussed herein, functionality implemented by the entity instance visualizer 12 may be attributed herein to the processor device 15.

Figure 2:
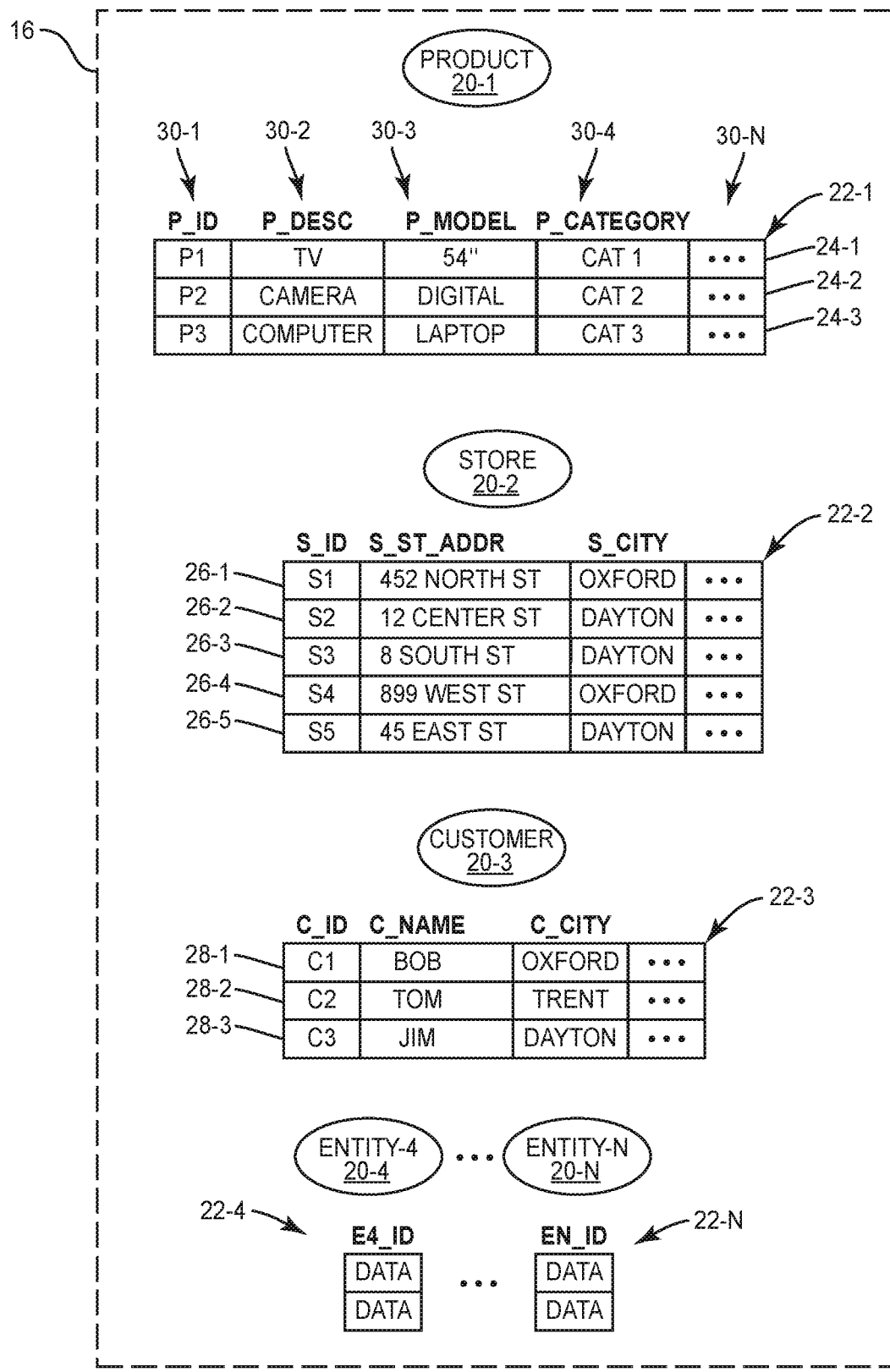
FIG. 2 is a block diagram illustrating aspects of an example database.

Prior to delving into the details of the operation of the entity instance visualizer 12, background and terminology relating to databases will be discussed to provide context for the subsequent discussion. FIG. 2 is a block diagram illustrating aspects of an example database 16. The database 16 models, or represents, a plurality of entities 20-1-20-N (generally, entities 20). Each entity 20 is of a particular entity type. In database terminology, an entity is an abstraction that represents a discrete thing (although not necessarily a physical thing) in a particular context. For example, in the database 16, the entities 20-1-20-3 represent, respectively, products, stores, and customers in a product retailer context. Entities 20-4-20-N may represent any other distinct things that may be useful in the product retailer context, and are illustrated to emphasize that while for purposes of illustration, the embodiments will be disclosed in the context of relationships among the three entities 20-1-20-3, the embodiments are not limited to any particular number of entities 20, and may be used to analyze the relationships among any number of different types of entities 20. The use of ellipses throughout the Figures indicates the presence of zero or more additional elements that may be present, but for purposes of clarity and brevity, are not illustrated.

Abstract entities 20-1-20-N are implemented in tangible form in the database 16 via corresponding entity structures 22-1-22-N (generally, entity structures 22). An entity structure 22 may be implemented in any desired format; however, for purposes of illustration, the entity structures 22 will be described as having a tabular format with one or more rows of information and one or more columns of information. Each row in an entity structure 22 represents an entity instance of that particular entity 20. Each entity instance corresponds to a particular one, or instance, of the thing being modeled by that particular entity 20, and is of the entity type of that particular entity 20.

For example, the entity structure 22-1 contains three entity instances 24-1-24-3 (generally, entity instances 24), each of which corresponds to a particular (different) product, and thus, each of which is a product-type entity instance 24. The entity structure 22-2 contains five entity instances 26-1-26-5 (generally, entity instances 26), each of which corresponds to a particular (different) store, and thus, each of which is a store-type entity instance 26. The entity structure 22-3 contains three entity instances 28-1-28-3 (generally, entity instances 28), each of which corresponds to a particular (different) customer, and thus, each of which is a customer-type entity instance 28. While each entity structure 22 is shown, for purposes of illustration, as having a relatively small number of entity instances, it should be apparent that in practice, one or more of the entity structures 22 may have thousands, or hundreds of thousands, of entity instances. For example, a large retailer may have hundreds of thousands, or millions, of different customers, and thus the entity structure 22-3 may have a corresponding number of entity instances 28.

Entity instances comprise data that describe the thing being modeled, or represented. Such data are categorized into different entity attributes, sometimes referred to herein as fields, with each entity attribute being associated with different data. With respect to an entity structure 22, entity attribute data about an entity are typically illustrated in a columnar fashion. Each entity attribute typically has an attribute name, or label. The entity attribute names are preferably indicative of the information, or data, stored in the entity attribute of a particular instance of the entity. Referring to the entity structure 22-1, for example, entity attribute names include "P_ID," which is the name of an entity attribute whose attribute data contain a unique identifier that uniquely identifies the product that corresponds to the particular entity instance 24; "P_DESC," which is the name of an entity attribute whose attribute data contain the description of the product corresponding to the particular entity instance 24; "P_MODEL," which is the name of an entity attribute whose attribute data contain the model of the product corresponding to the particular entity instance 24; and "P_CATEGORY," which is the name of the entity attribute whose attribute data contain the product category of the product corresponding to the particular entity instance 24.

The attribute data associated with the respective entity attribute are illustrated in corresponding columns 30-1-30-N of the entity structure 22-1. Thus, the attribute data associated with the entity attribute P_ID of entity instance 24-1 is "P01," the attribute data associated with the entity attribute P_DESC is "TV," the attribute data associated with the entity attribute P_MODEL is 54", and the attribute data associated with the entity attribute P_CATEGORY is "CAT 1."

In a similar fashion, the entity structures 22-2-22-N include one or more entity instances, each of which contains entity attribute data associated with that particular entity type. Each of the entity instances of the entity structures 22-1-22-4 includes, among other entity attributes, an entity attribute that uniquely identifies that entity instance from any other entity instance of that particular entity type. As mentioned previously, the unique entity attribute for the product entity type is the P_ID attribute. Thus, the P_ID attribute data of each entity instance 24 is unique. Similarly, the store entity 20-2 includes an "S_ID" attribute whose data uniquely identify store entity instances, and the customer entity 20-3 includes a "C_ID" attribute whose data uniquely identify customer entity instances. Such unique entity attributes will be referred to herein as entity instance identifiers.

For purposes of illustration and clarity, a reference to an entity instance or an entity structure 22 may be preceded by the particular entity type of the entity instance or entity structure 22 hereinafter. For example, the entity structure 22-1 may be referred to as the product entity structure 22-1, and an entity instance stored in the product entity structure 22-1 may be referred to as a product entity instance 24.

For purposes of illustration and clarity, references may be made herein from time to time to entity instances of an entity 20. Any such reference means that the entity instance is of the type of entity 20, and the actual attribute data that define the entity instance are maintained in a corresponding entity structure 22. For example, a reference to an entity instance of the product entity 20-1 means that the entity instance corresponds to a particular product, and the attribute data that define the particular entity instance are stored in the entity structure 22-1.

Entity instances of one entity structure 22 may have relationships with entity instances of another entity structure 22. Some relationships among entity instances may be relatively obvious, and others, less so. For example, a customer entity instance 28 of the customer entity structure 22-3 has a relationship with a particular product entity instance 24 of the product entity structure 22-1 if the customer corresponding to the customer entity instance 28 purchased the product corresponding to the particular product entity instance 24. This information may be valuable to the retailer because it may provide the retailer with potentially useful information about the customer, such as the fact that the customer may be a country music fan if the product is a country music CD. The particular product entity instance 24 is also related to a particular store entity instance 26 of the store entity structure 22-2 by virtue of the fact that the product was sold by the particular store that corresponds to that store entity instance 26. Notably, this latter relationship actually suggests a relationship between the particular customer entity instance 28 and the particular store entity instance 26 in that the particular customer purchased the country music CD from the particular store.

Understanding the relationships among entity instances can be valuable. For example, a retailer may be able to send specific and highly relevant offers to a particular customer if the retailer knows that the customer shops at a particular retailer location, or purchases particular categories of products. Consequently, it is not unusual for a database user to want to know what relationships exist among the entity instances in a database.

Determining relationships among entity instances may be relatively simple where a database models only a few types of entities. However, in practice, databases may model hundreds of different types of entities. Determining all the relationships among entity instances of hundreds of different entity structures 22 may be quite time-consuming, and once determined, writing the software reporting application(s) necessary to extract the data from the entity structures 22 in accordance with the determined relationships is also time-consuming and may be expensive.

Figure 3:
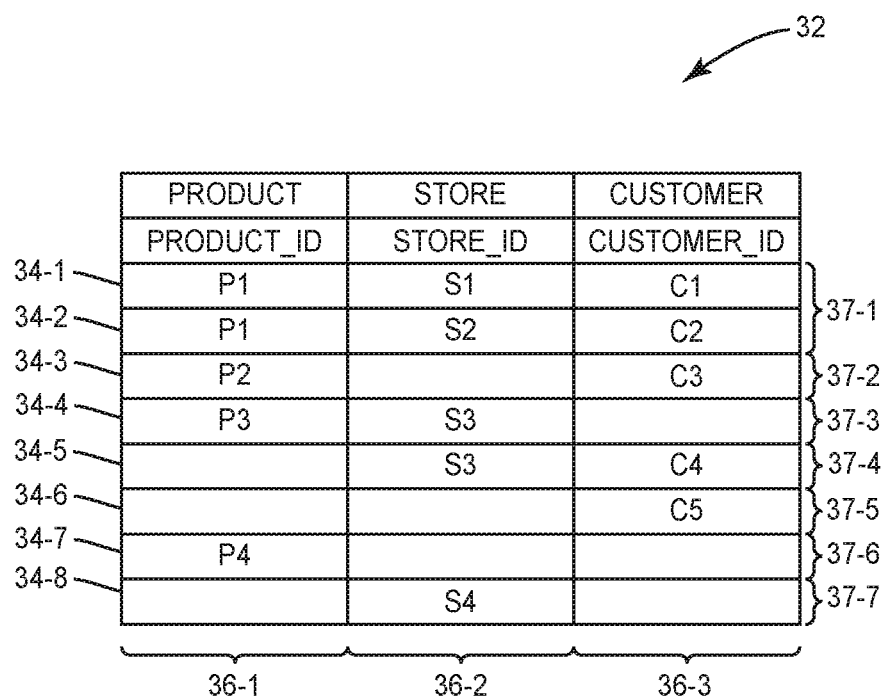
FIG. 3 illustrates a data table according to one embodiment.

FIG. 3 illustrates a data table 32 according to one embodiment. The data table 32 identifies, for a group of entity structures 22, relationships between entity instances contained in the group of entity structures 22. In this example, the data table 32 identifies, for the group of entity structures 22-1-22-3, relationships between entity instances 24, entity instances 26, and entity instances 28 contained in the entity structures 22-1-22-3, respectively. Each such relationship is identified in a row 34-1-34-8 (generally, rows 34) of the data table 32. Each row 34 contains a plurality of fields 36-1-36-3, each field 36-1-36-3 in each row 34 corresponding to a different one of the entity structures 22-1-22-3 in the group of entity structures 22. In this example, the field 36-1 of each row 34 corresponds to the entity structure 22-1, the field 36-2 of each row 34 corresponds to the entity structure 22-2, and the field 36-3 of each row 34 corresponds to the entity structure 22-3. The fields 36 may be empty, or may be non-empty and contain an entity instance identifier of the entity structure 22 with which the field 36 corresponds.

As an example, the field 36-3 of the row 34-1 is non-empty and contains an entity instance identifier C1, which identifies the entity instance 28-1 contained in the entity structure 22-3. The field 36-1 of the row 34-1 is non-empty and contains an entity instance identifier P1, which identifies the entity instance 24-1 contained in the entity structure 22-1, and the field 36-2 of the row 34-1 is non-empty and contains an entity instance identifier S1, which identifies the entity instance 26-1 contained in the entity structure 22-2. The row 34-1 thus establishes a relationship between the entity instances 28-1, 24-1, and 26-1. As another example, the field 36-3 of the row 34-8 is empty. The field 36-1 of the row 34-8 is empty, and the field 36-2 of the row 34-8 is non-empty and contains an entity instance identifier S4, which identifies the entity instance 26-4 contained in the entity structure 22-2. The row 34-8 thus indicates that there is no relationship between the entity instance 26-4 and any entity instance contained in the entity structures 22-1 or 22-3. As will be discussed in greater detail below, in one embodiment, the rows 34 may be analyzed to identify a plurality of subsets 37-1-37-7 (generally, subsets 37), wherein each subset 37 corresponds to a different combination of non-empty fields 36.

The data table 32 may be generated in any desirable manner. In one example, the data table 32 may comprise a table in the database 16-1 that may be populated automatically as the relationships identified in the rows 34 become known. For example, when a customer purchases a product at a store, a sales system may automatically populate the data table 32 with a row 34 identifying a relationship between the customer, the product, and the store. In other embodiments, a user, or an executing process, may issue one or more query commands, such as SQL commands, against the entity structures 22-1-22-3 to form the data table 32. Note that the data table 32 does not contain duplicate rows 34. In particular, no row 34 contains the same non-empty fields as any other row 34. Also, no row 34 is a subset of any other row 34.

Figure 4:
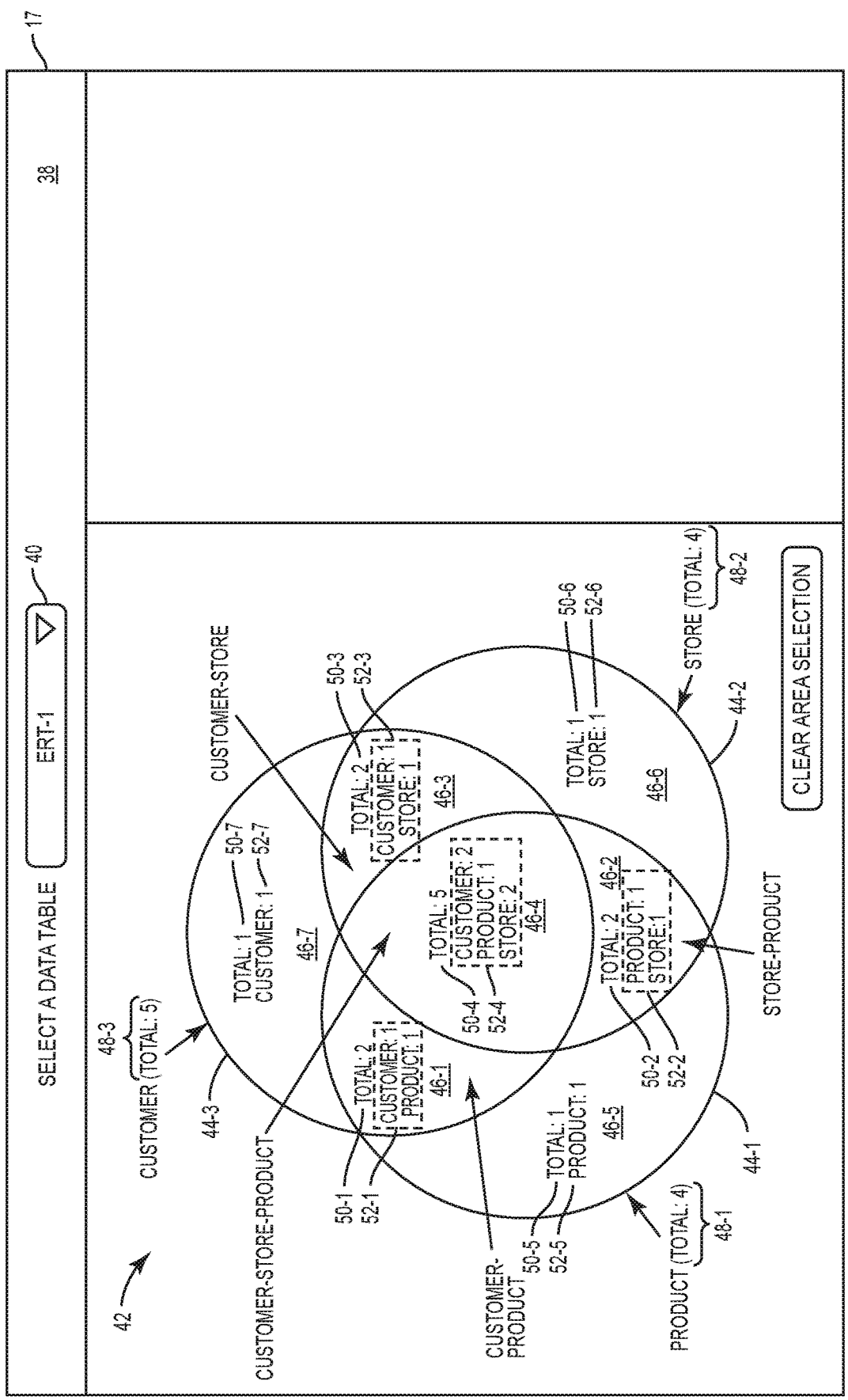
FIG. 4 illustrates an example user interface that may be presented on a display device according to one example.

FIG. 4 illustrates an example user interface 38 that may be presented on the display device 17 according to one example. In this example, the user interface 38 includes a data table selection control 40 that allows a user to select a particular data table. In this example, assume that the user selects the data table 32 illustrated in FIG. 3, referred to in FIG. 4 as "ERT-1". The entity instance visualizer 12 accesses the data table 32. The entity instance visualizer 12 generates, in the user interface 38, imagery 42 that depicts a plurality of objects 44-1-44-3 (generally, objects 44), each object 44 corresponding to a different entity structure 22, and each object 44 partially overlapping each other object 44 to form a plurality of overlapping areas 46-1-46-4 and non-overlapping areas 46-5-46-7. While for purposes of illustration the objects 44 are circles, the embodiments are not limited to circles and can be any shape or shapes that allow the depiction of overlapping and non-overlapping areas.

For each entity structure 22 in the group of entity structures 22-1-22-3, the entity instance visualizer 12 determines a unique number of entity instances of the entity structure 22 identified in the data table 32. The entity instance visualizer 12 may determine this information by summing the number of unique entity instance identifiers in the fields 36 of the data table 32. Thus, for the entity structure 22-1, the entity instance visualizer 12 determines that there are four unique entity instance identifiers P1, P2, P3, and P4 contained in the fields 36-1 of the rows 34-1-34-8. For the entity structure 22-2, the entity instance visualizer 12 determines that there are four unique entity instance identifiers S1, S2, S3, and S4 contained in the fields 36-2 of the rows 34-1-34-8. For the entity structure 22-3, the entity instance visualizer 12 determines that there are five unique entity instance identifiers C1, C2, C3, C4, and C5 contained in the fields 36-3 of the rows 34-1-34-8.

The entity instance visualizer 12 presents the unique number of entity instances for each entity structure 22 in the user interface 38 in association with the object 44 that corresponds to the respective entity structure 22. In this example, the entity instance visualizer 12 presents data 48-1 in association with the object 44-1 that indicates there are four unique entity instances 24 in the data table 32, data 48-2 in association with the object 44-2 that indicates there are four unique entity instances 26 in the data table 32, and data 48-3 in association with the object 44-3 that indicates there are five unique entity instances 28 in the data table 32.

Figure 5:
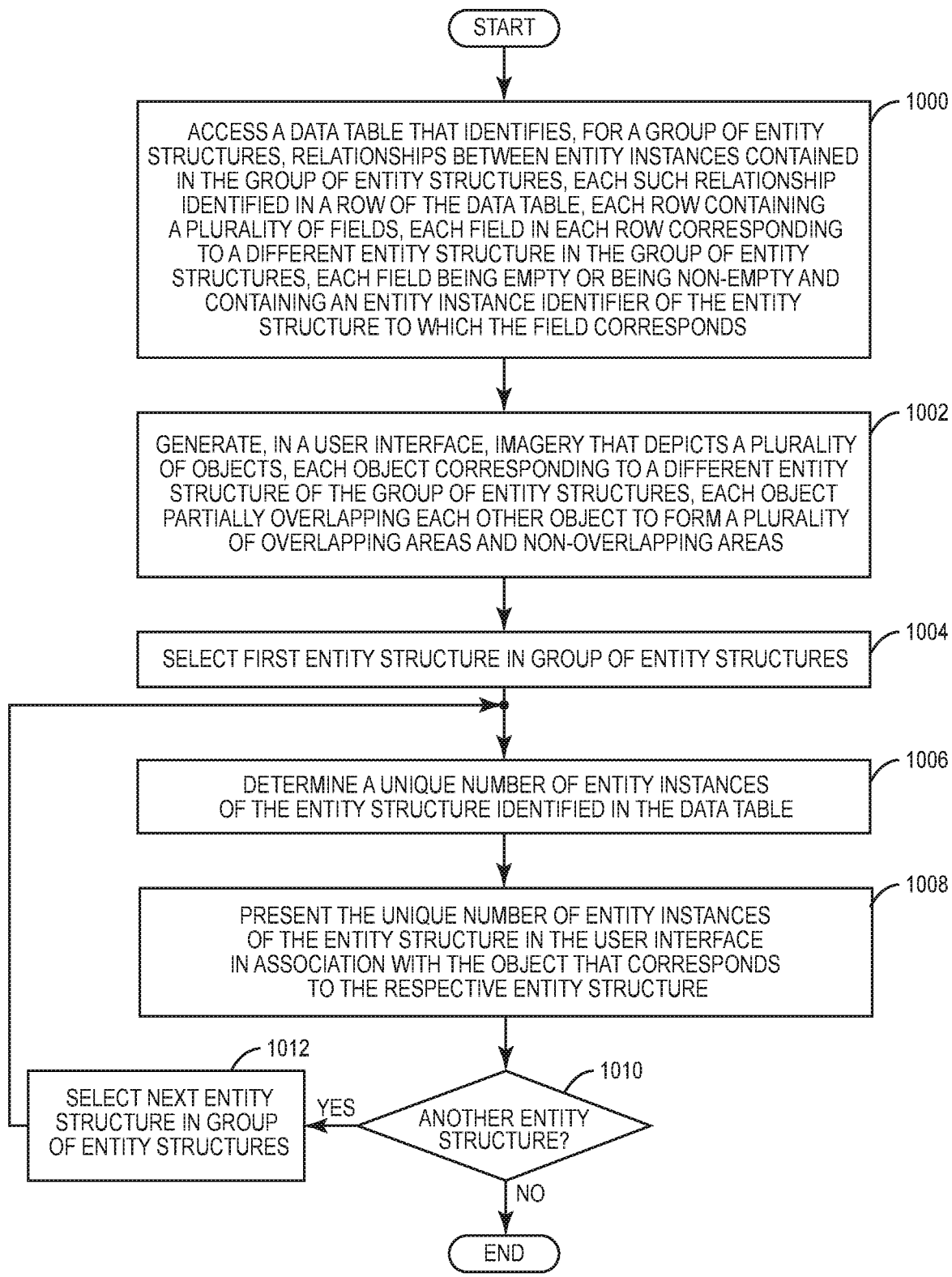
FIG. 5 is a flowchart of a method for visualizing entity instance relationships according to one embodiment.

FIG. 5 is a flowchart of a method for visualizing entity instance relationships according to one embodiment. FIG. 5 will be discussed in conjunction with FIG. 4. The entity instance visualizer 12 accesses the data table 32 that identifies, for the group of entity structures 22-1-22-3, relationships between entity instances contained in the group of entity structures 22-1-22-3, each such relationship identified in a row 34 of the data table 32, each row 34 containing a plurality of fields 36-1-36-3, each field 36-1-36-3 in each row 34 corresponding to a different entity structure 22 in the group of entity structures 22, each field 36 being empty or being non-empty and containing an entity instance identifier of the entity structure 22 to which the field 36 corresponds (FIG. 5, block 1000).

The entity instance visualizer 12 generates, in the user interface 38, the imagery 42 that depicts the plurality of objects 44, each object 44 corresponding to a different entity structure 22 of the group of entity structures 22, each object 44 partially overlapping each other object 44 to form the plurality of overlapping areas 46-1-46-4 and non-overlapping areas 46-5-46-7 (FIG. 5, block 1002).

The entity instance visualizer 12 selects a first entity structure 22 in the group of entity structures 22, such as the entity structure 22-1 (FIG. 5, block 1004). The entity instance visualizer 12 determines a unique number of entity instances of the entity structure 22-1 identified in the data table 32 (FIG. 5, block 1006). The entity instance visualizer 12 presents the data 48-1 that identifies the unique number of entity instances for the entity structure 22-1 in the user interface 38 in association with the object 44-1 that corresponds to the entity structure 22-1 (FIG. 5, block 1008). The entity instance visualizer 12 repeats this process for the entity structures 22-2-22-3 (FIG. 5, blocks 1010, 1012, 1006, and 1008).

Referring again to FIG. 4, the entity instance visualizer 12 may also identify the plurality of subsets 37 of the rows 34 of the data table 32, wherein each subset 37 corresponds to a different combination of non-empty fields 36. Each subset 37 includes those rows 34 of the data table 32 that have the corresponding combination of non-empty fields 36. For example, the subset 37-1 contains the rows 34-1 and 34-2, each of which contains zero non-empty fields 36. The subset 37-2 contains the row 34-3, which contains two non-empty fields 36-1 and 36-3, and one empty field 36-2. The subset 37-3 contains the row 34-4, which contains two non-empty fields 36-1 and 36-2 and one empty field 36-3. The subset 37-4 contains the row 34-5, which contains two non-empty fields 36-2 and 36-3 and one empty field 36-1. The subset 37-5 contains the row 34-6, which contains one non-empty field 36-3 and two empty fields 36-1 and 36-2. The subset 37-6 contains the row 34-7, which contains one non-empty field 36-1 and two empty fields 36-3 and 36-2. The subset 37-7 contains the row 34-8, which contains one non-empty field 36-2 and two empty fields 36-1 and 36-3.

Each subset 37 corresponds to one of the overlapping areas 46-1-46-4, or to one of the non-overlapping areas 46-5-46-7 based on the particular combination of non-empty fields 36 associated with the subset 37. For example, the subset 37-1 corresponds to the combination of zero non-empty fields 36, which means that each row 34 in the subset 37-1 contains an entity instance identifier contained in the customer entity structure 22-3 (field 36-3), an entity instance identifier contained in the product entity structure 22-1 (field 36-1), and an entity instance identifier contained in the store entity structure 22-2 (field 36-2). The subset 37-1 thus corresponds to the overlapping area 46-4, which is the overlapping area of the objects 44-1-44-3, which corresponds to the entity structures 22-1-22-3 respectively.

The subset 37-2 corresponds to the combination of non-empty fields 36-3 and 36-1, which means that each row 34 in the subset 37-2 contains an entity instance identifier contained in the customer entity structure 22-3 (field 36-3), an entity instance identifier contained in the product entity structure 22-1 (field 36-1), and no entity instance identifier contained in the store entity structure 22-2 (field 36-2). The subset 37-2 thus corresponds to the overlapping area 46-1, which is the overlapping area of the objects 44-1 and 44-3, which correspond to the entity structures 22-1 and 22-3, respectively.

The subset 37-3 corresponds to the combination of non-empty fields 36-1 and 36-2, which means that each row 34 in the subset 37-3 contains an entity instance identifier contained in the product entity structure 22-1 (field 36-1) and an entity instance identifier contained in the store entity structure 22-2 (field 36-2), and no entity instance identifier contained in the customer entity structure 22-3 (field 36-3). The subset 37-3 thus corresponds to the overlapping area 46-2, which is the overlapping area of the objects 44-1 and 44-2, which corresponds to the entity structures 22-1 and 22-2, respectively.

The subset 37-4 corresponds to the combination of non-empty fields 36-3 and 36-2, which means that each row 34 in the subset 37-4 contains an entity instance identifier contained in the customer entity structure 22-3 (field 36-3) and an entity instance identifier contained in the store entity structure 22-2 (field 36-2), and no entity instance identifier contained in the product entity structure 22-1 (field 36-1). The subset 37-4 thus corresponds to the overlapping area 46-3, which is the overlapping area of the objects 44-2 and 44-3, which corresponds to the entity structures 22-2 and 22-3, respectively.

The subset 37-5 corresponds to the combination of non-empty fields 36-3, which means that each row 34 in the subset 37-5 contains an entity instance identifier contained in the customer entity structure 22-3 (field 36-3) and no entity instance identifiers contained in the store entity structure 22-2 (field 36-2) or the product entity structure 22-1 (field 36-1). The subset 37-5 thus corresponds to the non-overlapping area 46-7, which is the non-overlapping area of the object 44-3, which corresponds to the entity structure 22-3.

The subset 37-6 corresponds to the combination of non-empty fields 36-1, which means that each row 34 in the subset 37-6 contains an entity instance identifier contained in the product entity structure 22-1 (field 36-1), and no entity instance identifiers contained in the customer entity structure 22-3 (field 36-3) or the store entity structure 22-2 (field 36-2). The subset 37-6 thus corresponds to the non-overlapping area 46-5, which is the non-overlapping area of the object 44-1, which corresponds to the entity structure 22-1.

The subset 37-7 corresponds to the combination of non-empty fields 36-2, which means that each row 34 in the subset 37-7 contains an entity instance identifier contained in the store entity structure 22-2 (field 36-2), and no entity instance identifiers contained in the customer entity structure 22-3 (field 36-3) or the product entity structure 22-1 (field 36-1). The subset 37-7 thus corresponds to the non-overlapping area 46-6, which is the non-overlapping area of the object 44-2, which corresponds to the entity structure 22-2.

In some embodiments, the entity instance visualizer 12 presents data 50-1-50-7 that identifies the total number of unique entity instances associated with each overlapping area 46-1-46-4 and non-overlapping area 46-5-46-7. For example, the data 50-1 indicates that there are two unique entity instances associated with the overlapping area 46-1. As another example, the data 50-4 indicates that there are five unique entity instances associated with the overlapping area 46-4.

Figure 6:
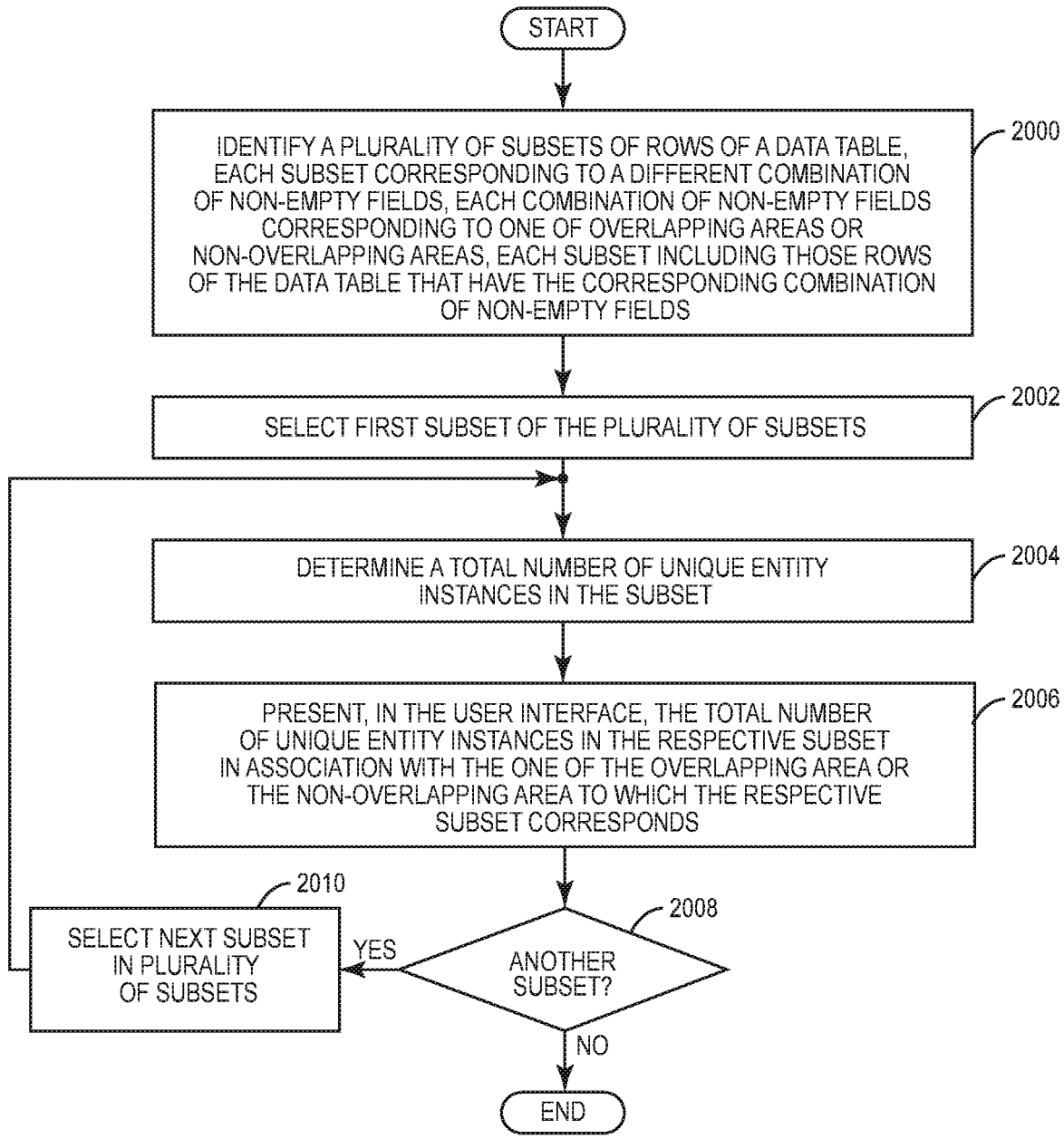
FIG. 6 is a flowchart of a method for determining and presenting data that identifies a total number of unique entity instances associated with an overlapping or non-overlapping area depicted in a user interface according to one embodiment.

FIG. 6 is a flowchart of a method for determining and presenting the data 50-1-50-7 in the user interface 38 according to one embodiment. FIG. 6 will be discussed in conjunction with FIGS. 3 and 4. The entity instance visualizer 12 processes the data table 32 and identifies the plurality of subsets 37-1-37-7 of the rows 34 of the data table 32, wherein each subset 37 corresponds to a different combination of non-empty fields 36, and each combination of non-empty fields 36 corresponds to one of the overlapping areas 46-1-46-4 or the non-overlapping areas 46-5-46-7. Each subset 37 includes those rows 34 of the data table 32 that have the corresponding combination of non-empty fields 36 (FIG. 6, block 2000).

The entity instance visualizer 12 then determines, for a first subset 37, a total number of unique entity instances in the subset 37 (FIG. 6, blocks 2002-2004). For example, with regard to the subset 37-1, the entity instance visualizer 12 processes the rows 34-1 and 34-2 and determines that there are five unique entity instance identifiers (P1, S1, S2, C1, C2) that identify five entity instances.

The entity instance visualizer 12 presents, in the user interface 38, for the subset 37-1, the data 50-4 that identifies the total number of unique entity instances in the subset 37-1 in association with the overlapping area 46-4 to which the subset 37-1 corresponds (FIG. 6, block 2006). The entity instance visualizer 12 repeats this process for the subsets 37-2-37-7 (FIG. 6, blocks 2008, 2010, 2004, and 2006).

In some embodiments, the entity instance visualizer 12 also presents data 52-1-52-7 that identifies the total number of unique entity instances for each entity structure that is associated with each overlapping area 46-1-46-4 and non-overlapping area 46-5-46-7. For example, the data 52-1 indicates that for the overlapping area 46-1, there is a total of one unique entity instance contained in the entity structure 22-3 (customer), and a total of one unique entity instance contained in the entity structure 22-1 (product). As another example, the data 52-4 indicates that for the overlapping area 46-4, there are a total of two unique entity instances contained in the entity structure 22-3 (customer), a total of one unique entity instance contained in the entity structure 22-1 (product), and a total of two unique entity instances contained in the entity structure 22-2 (store).

Figure 7:
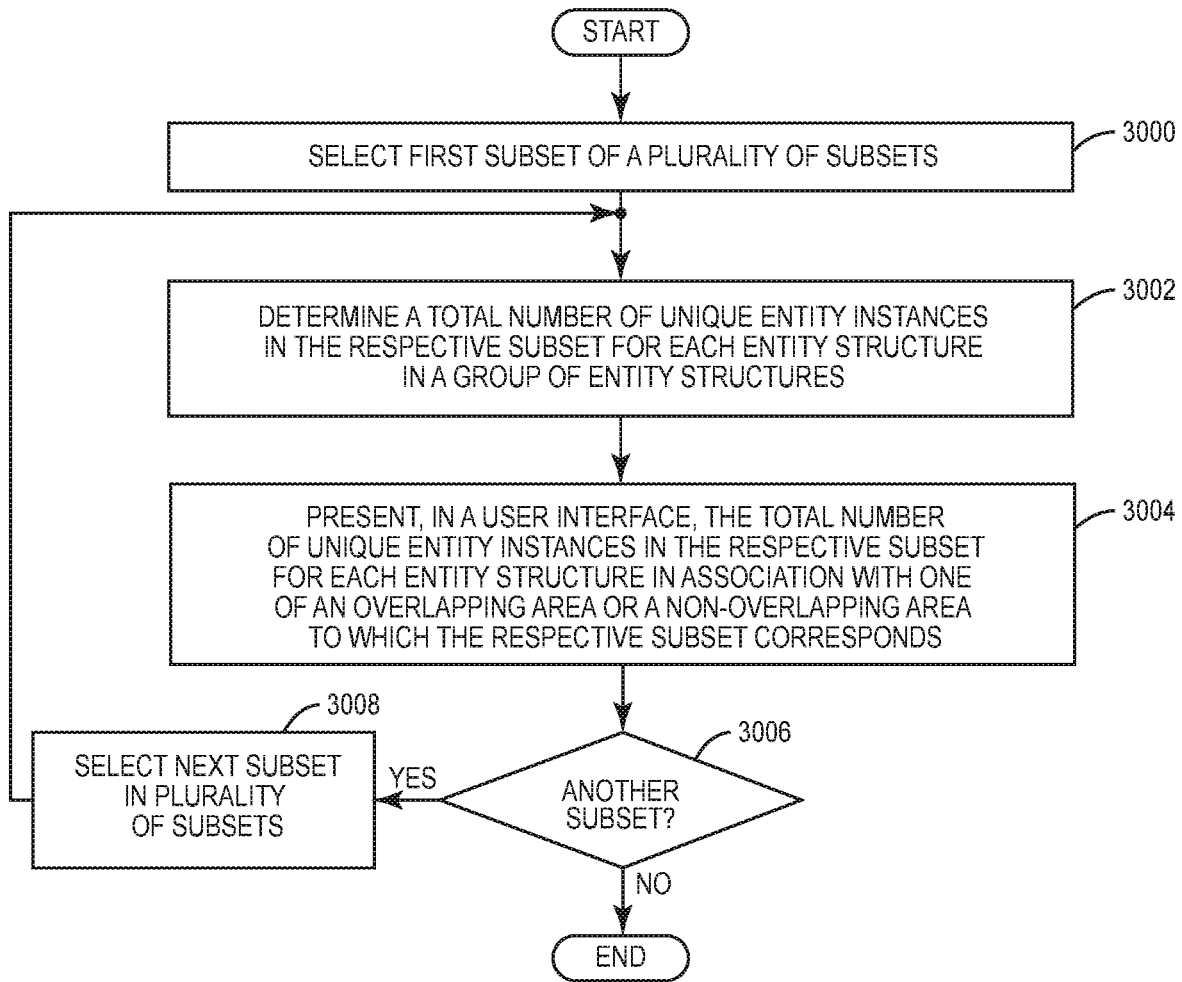
FIG. 7 is a flowchart of a method for determining and presenting data that identifies a total number of unique entity instances for each entity structure associated with an overlapping or non-overlapping area depicted in the user interface according to one embodiment.

FIG. 7 is a flowchart of a method for determining and presenting the data 52-1-52-7 in the user interface 38 according to one embodiment. FIG. 7 will be discussed in conjunction with FIGS. 3 and 4. The entity instance visualizer 12 determines, for a first subset 37, a total number of unique entity instances in the subset 37 for each entity structure 22 in the group of entity structures 22 (FIG. 7, blocks 3000-3002). For example, with regard to the subset 37-1, the entity instance visualizer 12 processes the rows 34-1 and 34-2 and determines that there is one unique entity instance (P1) associated with the entity structure 22-1 (product), two unique entity instances (S1, S2) associated with the entity structure 22-2 (product), and two unique entity instances (C1, C2) associated with the entity structure 22-3.

The entity instance visualizer 12 presents, in the user interface 38, for the subset 37-1, the data 52-4 that identifies the total number of unique entity instances in the subset 37-1 for each entity structure 22 in association with the overlapping area 46-4 to which the subset 37-1 corresponds (FIG. 7, block 3004). The entity instance visualizer 12 repeats this process for the subsets 37-2-37-7 (FIG. 7, blocks 3006, 3008, 3002, 3004).

Figure 8:
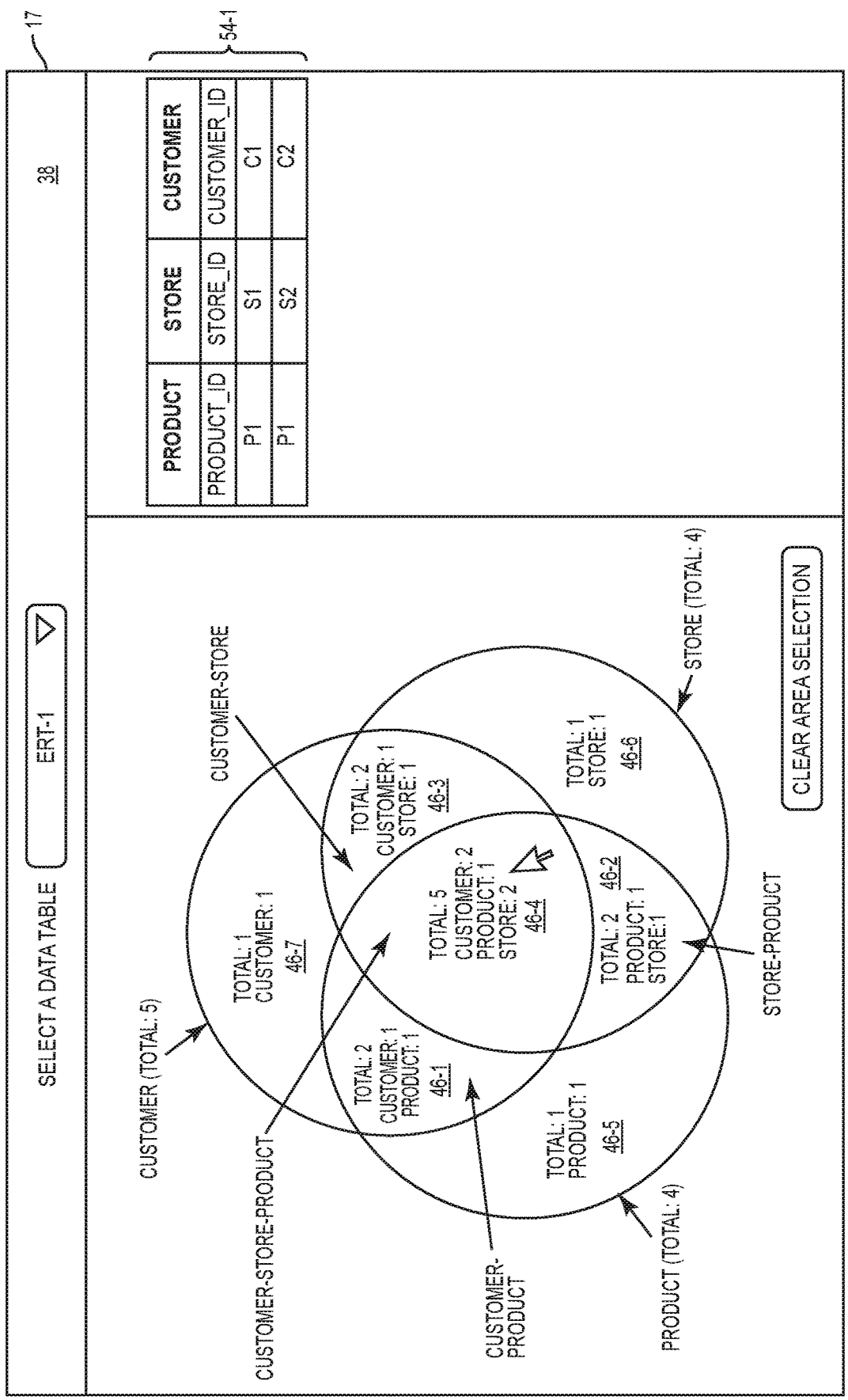
FIG. 8 is a diagram that illustrates interactive aspects of a user interface, according to one embodiment.

FIG. 8 is a diagram that illustrates interactive aspects of the user interface 38, according to one embodiment. In this example, a user may use an input device, such as a mouse, keyboard, or the like to select a particular overlapping area 46-1-46-4 or non-overlapping area 46-5-46-7. Upon selection of one or more overlapping areas 46-1-46-4 or non-overlapping areas 46-5-46-7, the entity instance visualizer 12 accesses the subset 37 of the rows 34 associated with the selected overlapping areas 46-1-46-4 or non-overlapping areas 46-5-46-7. For example, assume that a user using an input device, such as a mouse, selects the overlapping area 46-4. The entity instance visualizer 12 receives, via the input device, the selection of the overlapping area 46-4. The entity instance visualizer 12 identifies the subset 37-1 of the rows 34-1, 34-2 associated with the overlapping area 46-4. The entity instance visualizer 12 then presents, in the user interface 38 data 54-1 that depicts the subset 37-1 of the rows 34-1, 34-2 associated with the overlapping area 46-4. As illustrated in FIG. 8, the data 54-1 may also include one or more header rows that identify the names of the fields 36-1-36-3, and the names of the entity structures 22-1-22-3 associated with the overlapping area 46-4.

Figure 9:
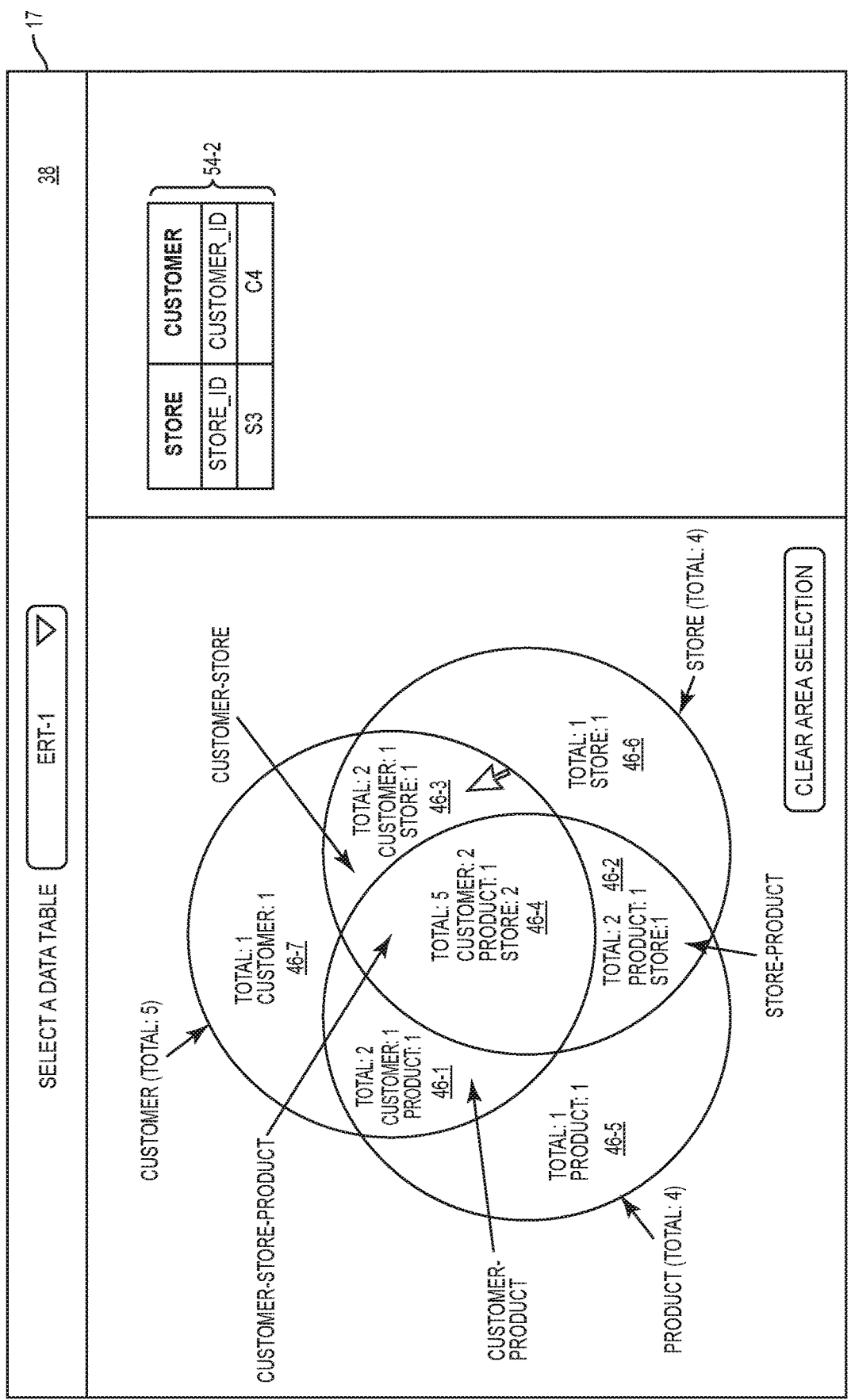
FIG. 9 is a diagram that illustrates additional interactive aspects of the user interface, according to one embodiment.

FIG. 9 is a diagram that illustrates additional interactive aspects of the user interface 38, according to one embodiment. In this example, assume that a user using an input device, such as a mouse, selects the overlapping area 46-3. The entity instance visualizer 12 receives, via the input device, the selection of the overlapping area 46-3. The entity instance visualizer 12 identifies the subset 37-4 of the row 34-5 associated with the overlapping area 46-3. The entity instance visualizer 12 then presents, in the user interface 38 data 54-2 that depicts the subset 37-4 of the row 34-5 associated with the overlapping area 46-3. As illustrated in FIG. 9, the data 54-2 may also include one or more header rows that identify the names of the fields 36-2-36-3, and the names of the entity structures 22-2-22-3 associated with the overlapping area 46-3.

Figure 10:
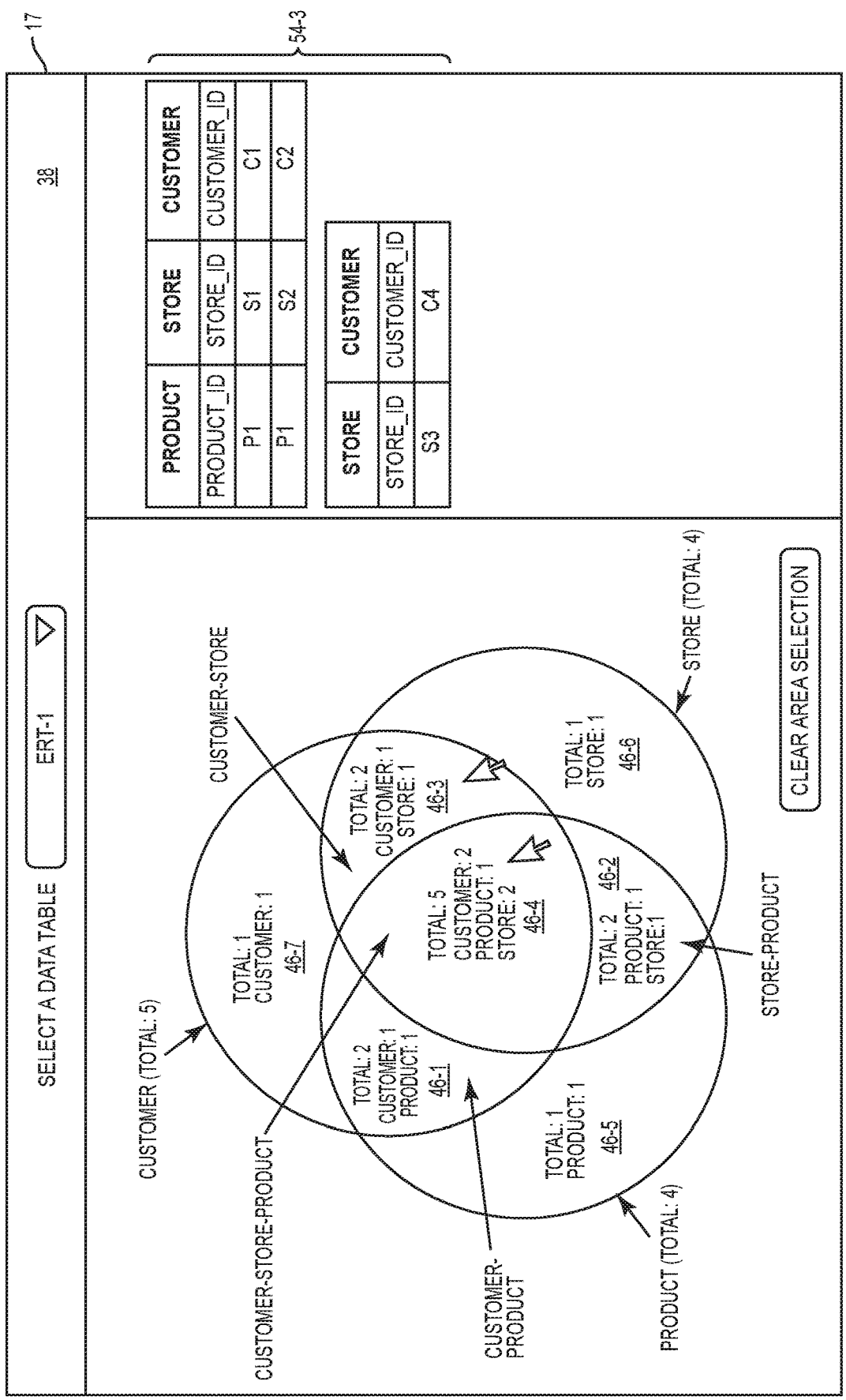
FIG. 10 is a diagram that illustrates additional interactive aspects of the user interface, according to one embodiment.

FIG. 10 is a diagram that illustrates additional interactive aspects of the user interface 38, according to one embodiment. In this example, assume that a user using an input device, such as a mouse, selects multiple overlapping areas 46-3 and 46-4. This may be implemented in any desired manner, such as by holding down a CTRL key of a keyboard while selecting each of the overlapping areas 46-3 and 46-4. The entity instance visualizer 12 receives, via the input device, the selection of the overlapping areas 46-3 and 46-4. The entity instance visualizer 12 identifies the subsets 37-1 and 37-4 as being associated with the overlapping areas 46-3 and 46-4, respectively. The entity instance visualizer 12 then presents, in the user interface 38, data 54-3 that depicts the subset 37-4 and the subset 37-1. As illustrated in FIG. 10, the data 54-3 may also include one or more header rows that identify the names of the fields 36-1-36-3 and the names of the entity structures 22-1-22-3, as appropriate, in conjunction with the subset 37-4 and the subset 37-1.

Figure 11:
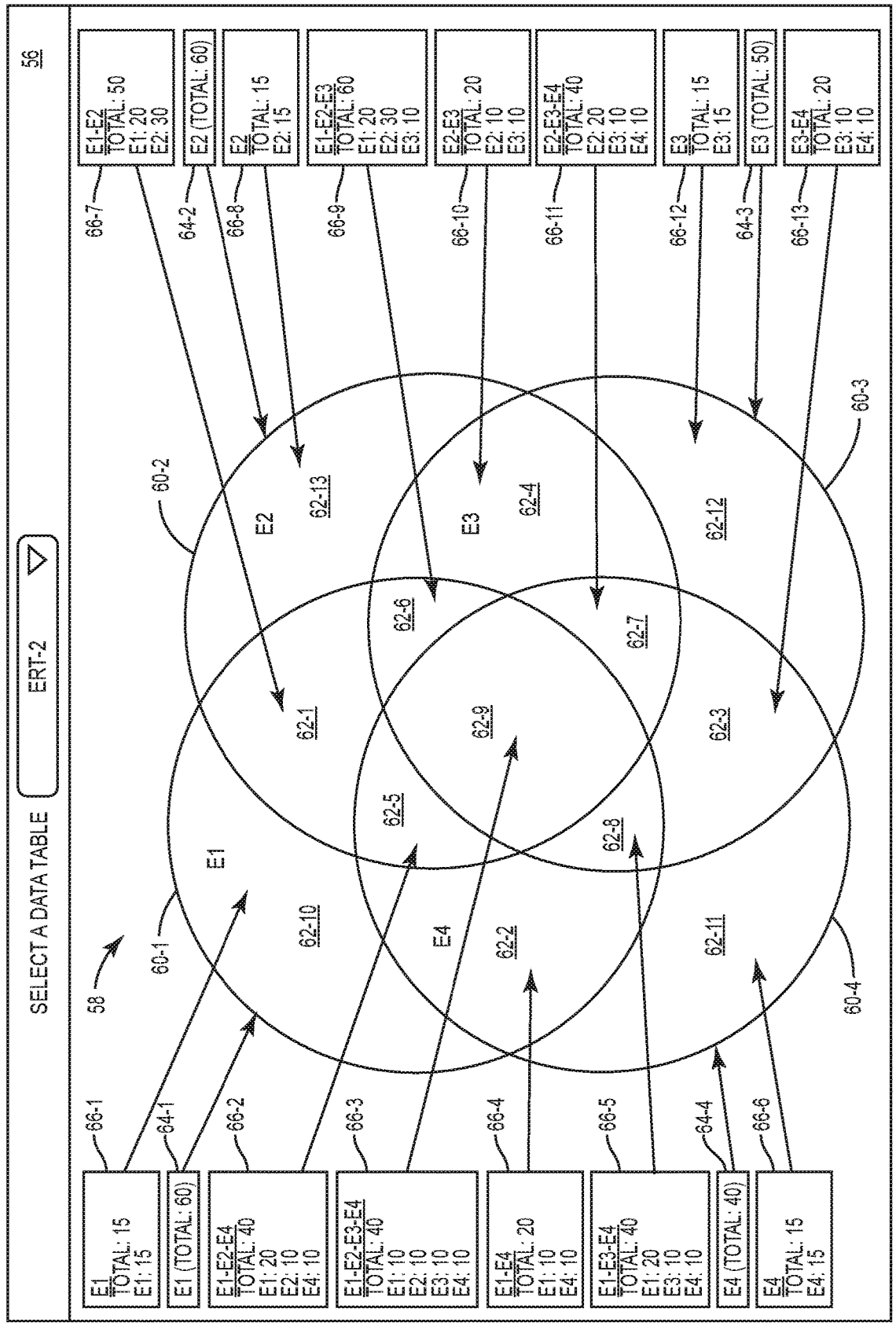
FIG. 11 illustrates a user interface according to another embodiment.

FIG. 11 illustrates a user interface 56 according to another embodiment. In this example, a data table identifies, for a group of four entity structures entitled E1, E2, E3, and E4, relationships between entity instances contained in the group of four entity structures, wherein each such relationship is identified in a row of the data table. Each row contains a plurality of fields, each field in each row corresponding to a different one of the four entity structures in the group of four entity structures, and each field being empty or being non-empty and containing an entity instance identifier of the entity structure to which the field corresponds.

Based on the data table, and in accordance with the flowchart illustrated in FIG. 5, the entity instance visualizer 12 generates, in the user interface 56, imagery 58 that depicts a plurality of objects 60-1-60-4, each object 60 corresponding to a different entity structure of the group of entity structures, each object 60 partially overlapping each other object 60 to form a plurality of overlapping areas 62-1-62-9 and non-overlapping areas 62-10-62-13. For each entity structure in the group of entity structures, the entity instance visualizer 12 determines a unique number of entity instances of the entity structure identified in the data table, and presents data 64-1-64-4 that identifies the unique number of entity instances for each entity structure in the user interface 56 in association with the object 60 that corresponds to the respective entity structure.

Based on the data table, and in accordance with the flowcharts illustrated in FIGS. 6 and 7, the entity instance visualizer 12 also identifies a plurality of subsets of rows of the data table, wherein each subset corresponds to a different combination of non-empty fields, and wherein each combination of non-empty fields corresponds to one of the overlapping areas 62-1-62-9 or non-overlapping areas 62-10-62-13. The entity instance visualizer 12 generates and presents data 66-1-66-13, which identifies the total number of unique entity instances in the respective subset in association with the one of the overlapping areas 62-1-62-9 or non-overlapping areas 62-10-62-13 with which the respective subset corresponds. The data 66-1-66-13 may also identify the total number of unique entity instances in the respective subset for each entity structure in association with the one of the overlapping area or the non-overlapping area to which the respective subset corresponds.

Figure 12:
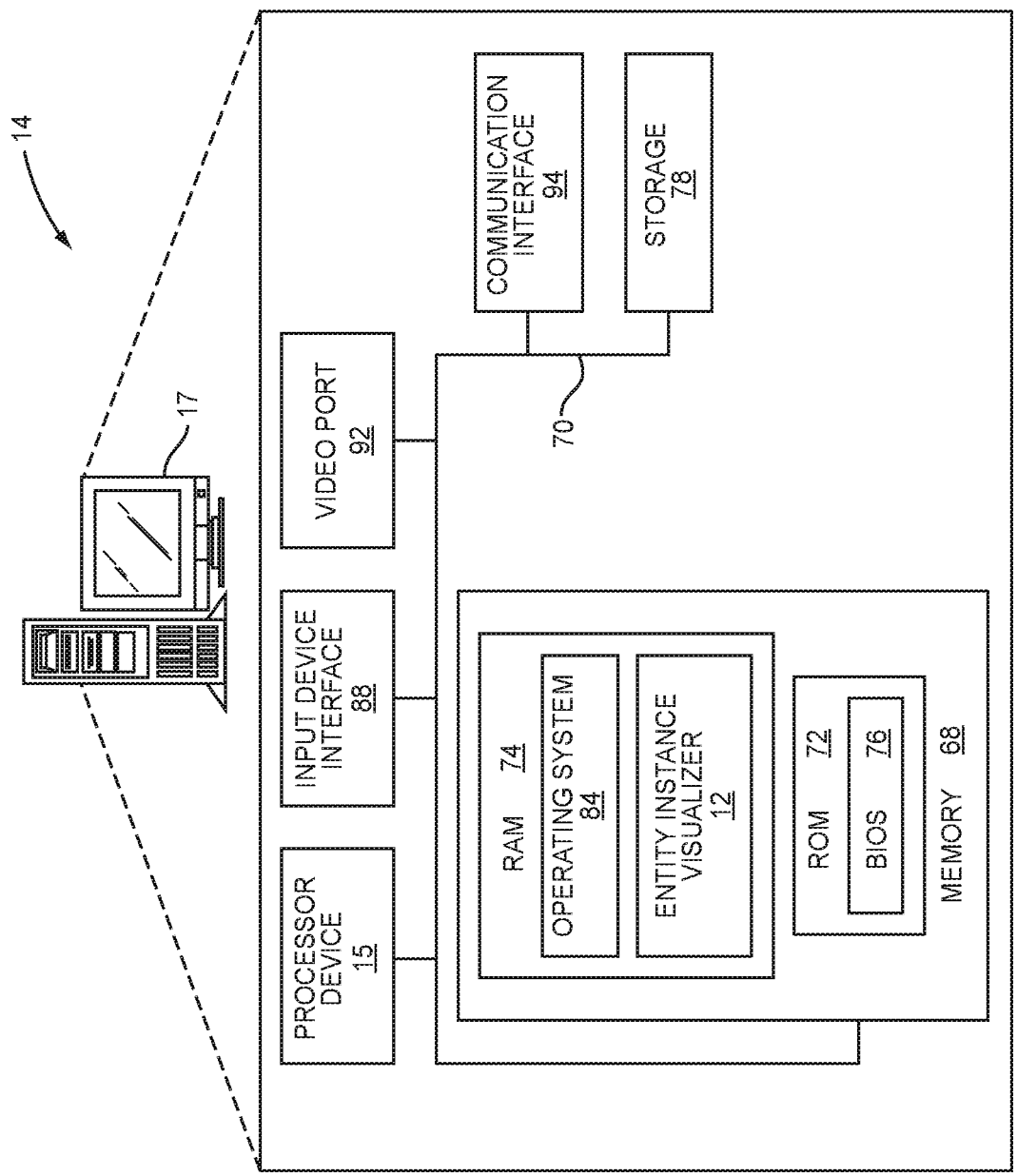
FIG. 12 illustrates an example computing device according to one embodiment.

FIG. 12 illustrates the example computing device 14 (FIG. 1) according to one embodiment. The computing device 14 may comprise, for example, a laptop computer, a desktop computer, a workstation, a proprietary mainframe computer, or the like. Alternately, the computing device 14 may comprise a special purpose computing device wherein the special purpose is to provide the functionality described herein. The computing device 14 may include the processor device 15; a system memory 68; and a system bus 70. The system bus 70 provides an interface for system components including, but not limited to, the system memory 68 and the processor device 15. The processor device 15 can be any of various commercially available or proprietary processors. Dual microprocessors and other multi-processor architectures may also be employed as the processor device 15.

The system bus 70 may be any of several types of bus structures that may further interconnect to a memory bus (with or without a memory controller), a peripheral bus, and/or a local bus using any of a variety of commercially available bus architectures. The system memory 68 may include non-volatile memory 72 (e.g., read only memory (ROM), erasable programmable read only memory (EPROM), electrically erasable programmable read only memory (EEPROM), etc.) and/or volatile memory 74 (e.g., random access memory (RAM)). A basic input/output system (BIOS) 76 may be stored in the non-volatile memory 72, and can include the basic routines that help to transfer information between elements within the computing device 14. The volatile memory 74 may also include a high-speed RAM such as static RAM for caching data.

The computing device 14 may further include a computer-readable storage 78, which may comprise, for example, an internal hard disk drive (HDD) (e.g., enhanced integrated drive electronics (EIDE) or serial advanced technology attachment (SATA)) for storage, flash memory, or the like. The database 16 (FIG. 2) may be stored in the computer-readable storage 78, for example. The drives and associated computer-readable and computer-usable media provide non-volatile storage of data, data structures, computer-executable instructions, and so forth. Although the description of computer-readable media above refers to an HDD, it should be appreciated by those skilled in the art that other types of media which are readable by a computer, such as Zip disks, magnetic cassettes, flash memory cards, cartridges, and the like, may also be used in the exemplary operating environment, and further, that any such media may contain computer-executable instructions for performing novel methods of the disclosed architecture.

A number of program modules can be stored in the computer-readable storage 78 and in the volatile memory 74, including an operating system 84 and one or more program modules, such as the entity instance visualizer 12, which may implement the functionality described herein in whole or in part, and other processing and functionality described herein. It is to be appreciated that the embodiments can be implemented with various commercially available operating systems 84 or combinations of operating systems 84.

All or a portion of the embodiments may be implemented as a computer program product stored on a non-transitory computer-usable or computer-readable medium, such as the computer-readable storage 78, and including instructions configured to cause the processor device 15 to carry out the steps described herein. Thus, the computer-readable program code can comprise software instructions for implementing the functionality of the embodiments described herein when executed on the processor device 15. The processor device 15, in conjunction with the entity instance visualizer 12 in the volatile memory 74, may serve as a control system for the computing device 14 that is configured to, or adapted to, implement the functionality described herein.

Alternately, all or a portion of the entity instance visualizer 12 may be implemented in hardware, such as in a special-purpose database processor designed specifically to implement the functionality discussed herein.

An administrator or user may be able to enter commands and information into the computing device 14 through one or more input devices, such as, for example, a touch sensitive display (not illustrated); a keyboard (not illustrated); or a pointing device, such as a mouse (not illustrated). Other input devices (not illustrated) may include a microphone, an infrared (IR) remote control, a joystick, a game pad, a stylus pen, or the like. These and other input devices may be connected to the processor device 15 through an input device interface 88 that is coupled to the system bus 70, but can be connected by other interfaces such as a parallel port, an IEEE 13114 serial port, a game port, a universal serial bus (USB) port, an IR interface, etc.

The computing device 14 may drive a separate or integral display device 17, which may also be connected to the system bus 70 via an interface, such as a video port 92. The computing device 14 preferably includes a communication interface 94 for communicating with the network 18 (FIG. 1), which may comprise, for example a wireless LAN or wireless personal area network technology, including, for example, Wi-Fi®, Bluetooth®, or ZigBee®.

FIGS. 13-20 illustrate another embodiment of the entity instance visualizer 12. FIG. 13 illustrates a relationship data structure 100 according to one embodiment. The relationship data structure 100 identifies relationships between entity instances of the entity structures 22-1-22-3. FIGS. 13-20 assume different data entity instances are stored in the entity structures 22-1-22-3 than that illustrated in in FIG. 2; however, other than being different data, the description and attributes of the entity structures 22-1-22-3 are substantially the same as discussed previously. The relationship data structure 100 comprises data contained in, and in some embodiments, extracted from, the entity structures 22-1-22-3. The relationship data structure 100 may be generated in any desirable manner. In one example, the relationship data structure 100 may comprise a table in a database that may be populated automatically as the relationships identified in the relationship data structure 100 become known. For example, when a customer purchases a product at a store, a sales system may automatically populate the relationship data structure 100 to identify a relationship between the customer, the product, and the store. In other embodiments, a user, or an executing process, may issue one or more query commands, such as SQL commands, against the entity structures 22-1-22-3 to form the relationship data structure 100. The set of data contained in the relationship data structure 100 may be based on a subset of the records stored in the entity structures 22-1-22-3, or may be based on all records stored in the entity structures 22-1-22-3.

The relationship data structure 100 comprises a plurality of relationship sets 102-1-102-8 (generally, relationship sets 102), illustrated herein in the form of a plurality of rows of different data fields 104-1-104-6. The relationship sets 102-1-102-8 identify, for a set of data that corresponds to entity instances stored in the group of entity structures 22-1-22-3, relationships between entity instances in the set of data. What constitutes a relationship between entity instances of different entity structures may differ depending on the type of entity structures, and may be based on any desired criteria by which one wants to associate a particular entity instance of one structure with one or more particular entity instances of other entity structures. In this example, the relationship sets 102-1-102-8 identify, for the group of entity structures 22-1-22-3, relationships between entity instances 24, entity instances 26, and entity instances 28. Each relationship set 102 contains a plurality of data fields 104-1-104-6. In this example, a unique entity instance data field 104-1 of each relationship set 102 corresponds to the entity structure 22-3, and, if non-empty, contains an entity instance identifier that identifies an entity instance of the entity structure 22-3; a unique entity instance data field 104-2 of each relationship set 102 corresponds to the entity structure 22-1, and, if non-empty, contains an entity instance identifier that identifies an entity instance of the entity structure 22-1; and a unique entity instance data field 104-3 of each relationship set 102 corresponds to the entity structure 22-2 and, if non-empty, contains an entity instance identifier that identifies an entity instance of the entity structure 22-2. Thus, the unique entity instance data fields 104-1-104-3 may be empty, or may be non-empty, and, if non-empty, contain a unique entity instance identifier of the entity structure 22 with which the data field 104 corresponds. Note that the relationship data structure 100 does not contain duplicate relationship sets 102.

In this example, the relationship sets 102 also include a plurality of attribute data fields 104-4-104-6. Each attribute data field 104-4-104-6 corresponds to one of the unique entity instance data fields 104-1-104-3. In this example, the attribute data field 104-4 corresponds to the unique entity instance data field 104-1; the attribute data field 104-5 corresponds to the unique entity instance data field 104-2; and the attribute data field 104-6 corresponds to the unique entity instance data field 104-3. While for purposes of illustration the relationship sets 102 are illustrated as having one attribute data field 104-4-104-6 that corresponds to each unique entity instance data field 104-1-104-3, in practice the relationship sets 102 may have any number of attribute data fields 104 that correspond to a particular unique entity instance data field 104.

The relationship data structure 100 also includes a data field identifier set 106 that identifies, for each data field 104-1-104-6, a corresponding attribute name of the data contained in a data field 104-1-104-6, if such data field is non-empty. For example, data field 104-1 of the data field identifier set 106 indicates that the attribute name of the unique entity instance identifier that may be stored in the data field 104-1 is "CUSTOMER_ID"; data field 104-2 of the data field identifier set 106 indicates that the attribute name of the unique entity instance identifier that may be stored in the data field 104-2 is "PRODUCT_ID"; data field 104-3 of the data field identifier set 106 indicates that the attribute name of the unique entity instance identifier that may be stored in the data field 104-3 is "STORE_ID"; data field 104-4 of the data field identifier set 106 indicates that the attribute name of the attribute that may be stored in the data field 104-4 is "CUSTOMER_NAME"; data field 104-5 of the data field identifier set 106 indicates that the attribute name of the attribute that may be stored in the data field 104-5 is "PRODUCT_NAME"; and data field 104-6 of the data field identifier set 106 indicates that the attribute name of the attribute that may be stored in the data field 104-6 is "STORE LOC."

The relationship sets 102-1-102-8 each correspond to a particular type of relationship. For the complete set of entity structures 22-1-22-3 in the relationship data structure 100, the total number R of the types of relationships can be determined in accordance with the following formula, $$R = \sum_{r=1}^{N} \frac{N!}{(r!(N-r)!)}$$

wherein N is the number of different entity structures 22 in a group of different entity structures 22.

Figure 19A:
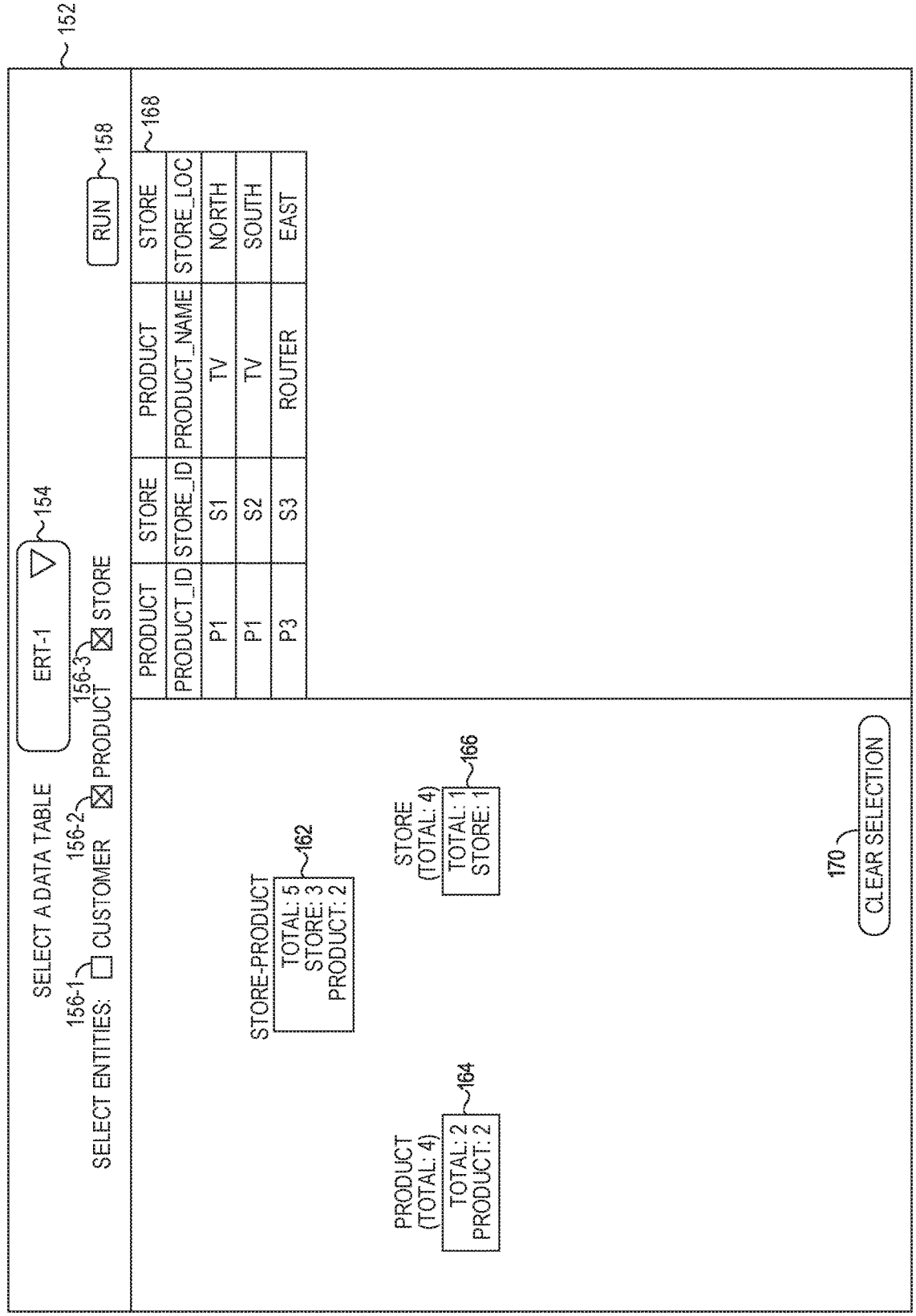
FIGS. 19A-19B illustrate an example user interface and sequence of possible user input actions according to another embodiment.
Figure 19B:
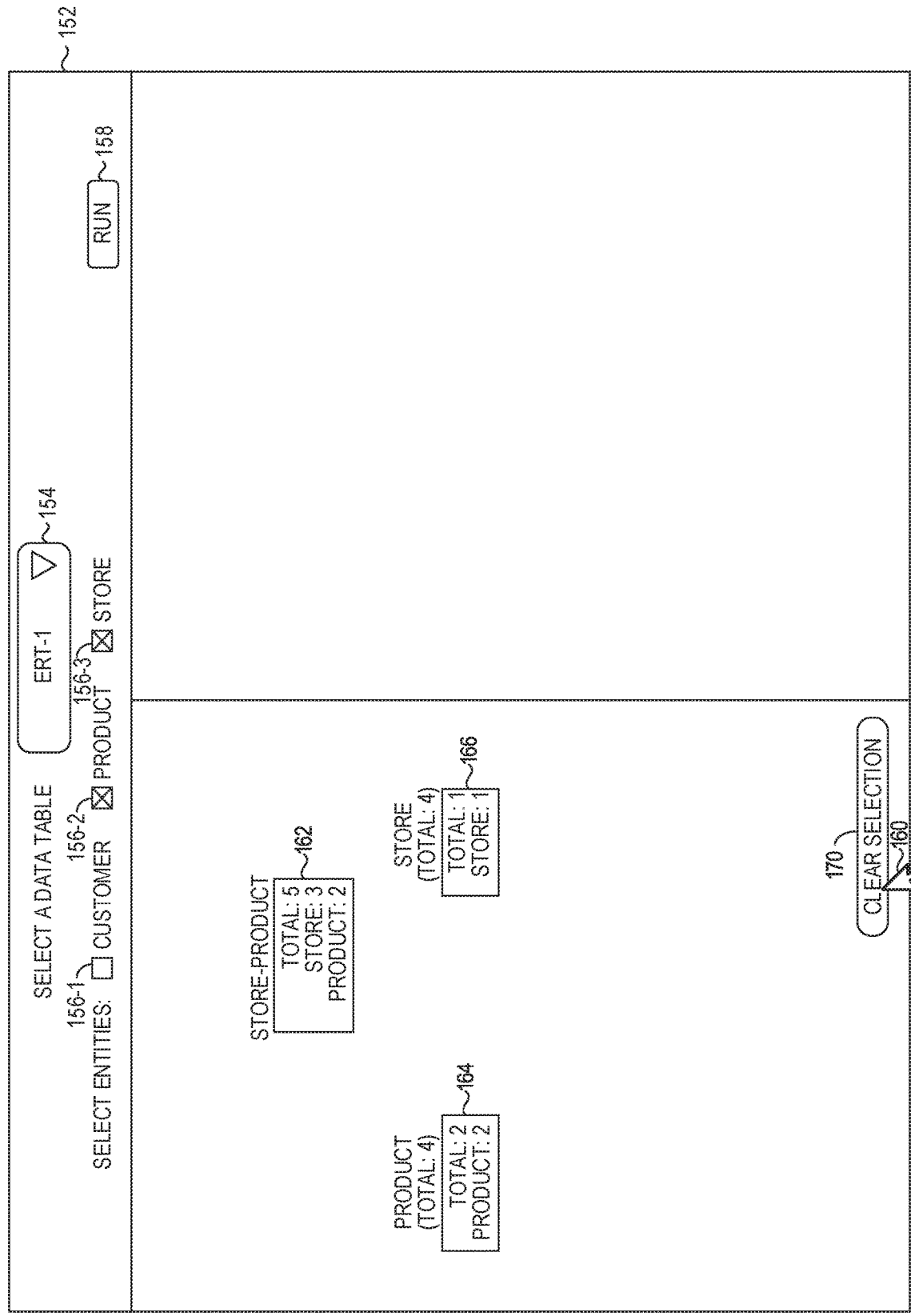

Note that the embodiments described herein can analyze all the entity structures 22-1-22-3 contained in the relationship data structure 100, or, as discussed in greater detail with regard to FIGS. 19A-19B for example, can operate with a selected subset of the entity structures 22-1-22-3. While for purposes of illustration the embodiments are generally discussed herein as if each of the entity structures 22-1-22-3 have been selected for analysis, it should be noted that the algorithms operate the same if a subset of the entity structures 22-1-22-3 have been selected, but the numbers of relationships that can be represented differ depending on the number of entity structures 22-1-22-3 selected.

The relationship sets 102-1-102-5 each identify relationships between at least two entity instances of different entity structures 22-1-22-3. The total number S of the types of relationships of at least two entity instances can be determined in accordance with the following formula, $$S = \sum_{r=1}^{N} \frac{N!}{(r!(N-r)!)} - N$$

wherein N is the number of different entity structures 22 in a group of different entity structures 22.

It is noted that if only two entity structures 22-1-22-3 had been selected for analysis, such as the entity structures 22-1 and 22-2, S would equal one.

In this example, because there are three entity structures 22-1-22-3, the total number R types of relationships is seven. In particular, in the example of three different entity structures 22-1-22-3, the following are the seven possible types of relationships, each of which corresponds to a different subset of entity structures 22-1-22-3:

1) CUSTOMER-STORE-PRODUCT
2) CUSTOMER-PRODUCT
3) CUSTOMER-STORE
4) PRODUCT-STORE
5) CUSTOMER
6) PRODUCT
7) STORE

It is noted that if only two entity structures 22-1-22-3 had been selected for analysis, such as the entity structures 22-1 and 22-2, R would equal three.

Each relationship set 102-1-102-8 corresponds to a particular type of relationship, and the type of relationship to which a relationship set 102-1-102-8 corresponds is determined by the non-empty unique entity instance data fields 104-1-104-3 of the respective relationship set 102-1-102-8. Relationship type 1 identifies a relationship between a particular customer, a particular product, and a particular store, each of which is identified in the relationship data structure 100. This type of relationship may be established by the purchase of a product at a store by a customer, and each of the product, the store, and the customer is identified in the set of data that makes up the relationship data structure 100. The subset of entity structures 22-1, 22-2, and 22-3 corresponds to the relationship type 1. Relationship type 2 identifies a relationship between a particular customer and a particular product. This type of relationship may be established by the purchase of a product by a customer; however, the purchase was not at any store that is identified in the set of data that makes up the relationship data structure 100. The subset of entity structures 22-1 and 22-3 correspond to the relationship type 2. Relationship type 3 identifies a relationship between a particular customer and a particular store. This type of relationship may be established by the purchase of a product by a customer at a particular store; however, the product was not a product that is identified in the set of data that makes up the relationship data structure 100. The subset of entity structures 22-2 and 22-3 correspond to the relationship type 3. Relationship type 4 identifies a relationship between a particular product and a particular store. This type of relationship may be established by the existence of a particular product at a particular store; however, the product was not purchased from that store by any customer identified in the set of data that makes up the relationship data structure 100. The subset of entity structures 22-1 and 22-2 correspond to the relationship type 4. Relationship type 5 identifies those customers in the set of data that makes up the relationship data structure 100 that have no relationship with any product or any store identified in set of data that makes up the relationship data structure 100. The subset of the entity structure 22-3 corresponds to the relationship type 5. Relationship type 6 identifies those products in the set of data that makes up the relationship data structure 100 that have no relationship with any customer or any store identified in set of data that makes up the relationship data structure 100. The subset of the entity structure 22-1 corresponds to the relationship type 6. Relationship type 7 identifies those stores in the set of data that makes up the relationship data structure 100 that have no relationship with any customer or any product identified in set of data that makes up the relationship data structure 100. The subset of the entity structure 22-2 corresponds to the relationship type 7.

Different subsets of the relationship sets 102-1-102-8 correspond to different types of relationships. The subset of relationship sets 102-1-102-2 correspond to the relationship type 1 above, the subset of the relationship set 102-3 corresponds to relationship type 2 above, the subset of the relationship set 102-4 corresponds to relationship type 4 above, the subset of the relationship set 102-5 corresponds to relationship type 3 above, the subset of the relationship set 102-6 corresponds to relationship type 5 above, the subset of the relationship set 102-7 corresponds to relationship type 6 above, and the subset of the relationship set 102-8 corresponds to relationship type 7 above.

FIG. 14 illustrates a relationship metadata table 108 according to one embodiment. In this embodiment, the relationship metadata table 108 comprises a plurality of entity attribute information rows 110-1-110-6 (generally, entity attribute information rows 110), each of which corresponds to one of the data fields 104-1-104-6 of the relationship data structure 100 (FIG. 13). Each of the entity attribute information rows 110-1-110-6 has a predetermined format. In particular, each respective entity attribute information row 110 contains an entity field 112-1 which identifies the entity structure 22-1-22-3 with which the respective entity attribute information row 110 corresponds. Each respective entity attribute information row 110 contains an entity field 112-2 which can be used in conjunction with the data fields 104-1-104-6 of the data field identifier set 106 to identify the data field 104-1-104-6 with which the respective entity attribute information row 110 corresponds. Each respective entity attribute information row 110 contains an entity field 112-3 which indicates whether or not the attribute identified in the entity field 112-2 of the same respective entity attribute information row 110 is a unique identifier or not.

As an example, entity field 112-1 of the entity attribute information row 110-1 indicates that the entity attribute information row 110-1 corresponds to the entity structure 22-3 ("CUSTOMER"). Entity field 112-2 of the entity attribute information row 110-1 indicates that the entity attribute information row 110-1 corresponds to the data field 104-1 ("CUSTOMER_ID"). The value "1" in the entity field 112-3 of the entity attribute information row 110-1 indicates that the data field 104-1, if non-empty, contains a unique identifier of an entity instance of the customer entity structure 22-3.

As one more example, entity field 112-1 of the entity attribute information row 110-2 indicates that the entity attribute information row 110-2 corresponds to the entity structure 22-3 ("CUSTOMER"). Entity field 112-2 of the entity attribute information row 110-2 indicates that the entity attribute information row 110-2 corresponds to the data field 104-4 ("CUSTOMER_NAME"). The value "0" in the entity field 112-3 of the entity attribute information row 110-2 indicates that the data field 104-4, if non-empty, contains non-unique attribute data of an entity instance of the customer entity structure 22-3.

Figure 15:
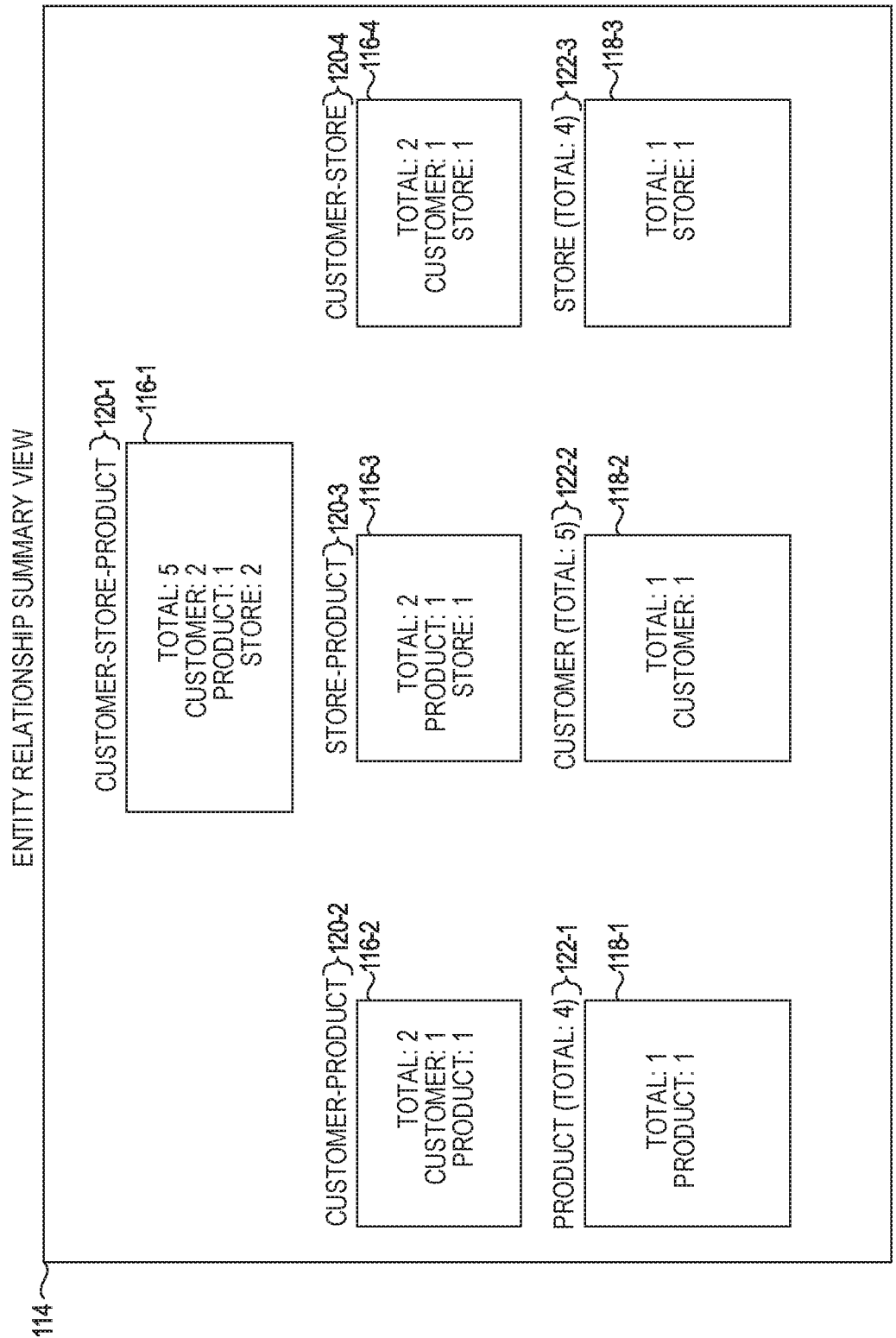
FIG. 15 illustrates an entity relationship summary view that may be derived from a relationship data structure and a metadata relationship metadata table according to one embodiment.

FIG. 15 illustrates an entity relationship summary view 114 that may be derived from the relationship data structure 100 and the relationship metadata table 108 according to one embodiment. The content of the entity relationship summary view 114 will be discussed with reference to FIG. 15, and the generation of the entity relationship summary view 114 will be discussed with reference to FIGS. 16A-16B. The entity relationship summary view 114 depicts, on the display device 17, a plurality of relationship icons 116-1-116-4, and a plurality of entity structure icons 118-1-118-3. In this example, the relationship icons 116-1-116-4 and the entity structure icons 118-1-118-3 are rectangles, but any suitable shape may be used, and one shape may be used for the relationship icons 116-1-116-4 and a different shape may be used for the entity structure icons 118-1-118-3.

Each of the relationship icons 116-1-116-4 corresponds to one of the number S of the types of relationships of at least two entity instances 22. As discussed above, in this example with only three different entity structures, there are four types of relationships of at least two entity instances (R-N, 7−3=4). For each of the relationship icons 116-1-116-4, the summary view 114 includes information 120-1-120-4 that identifies the subset of entity structures that corresponds to the type of relationship to which the relationship icons 116-1-116-4 correspond. For each of the entity structure icons 118-1-118-3, the summary view 114 includes corresponding information 122-1-122-3 that identifies the entity structure 22-1-22-3 to which the entity structure icons 118-1-118-3 correspond, and a total number of unique entity instance identifiers of the same entity type that are identified in the relationship data structure 100, irrespective of which entity structures 22 have been selected for analysis.

For each relationship icon 116-1-116-4, the summary view 114 identifies the total number of unique entity instance identifiers irrespective of entity type that are identified in the subset of relationship sets 102 that corresponds to the relationship icon 116-1-116-4 and, for each entity structure 22 in the subset of entity structures 22 that corresponds to the relationship icon 116-1-116-4, the total number of unique entity instances of the same entity type.

As an example, the relationship icon 116-1 corresponds to the relationship type 1 discussed above (CUSTOMER-STORE-PRODUCT), indicated by the information 120-1. Referring to the relationship data structure 100, the subset of relationship sets 102-1 and 102-2 correspond to the relationship type 1, because the relationship sets 102-1 and 102-2 contain non-empty unique entity instance data fields 104-1-104-3. The subset of relationship sets 102-1 and 102-2 identify a total of five unique entity instance identifiers irrespective of entity type (C1, C2, P1, S1, and S2). Thus, the summary view 114 indicates that there are a total of five unique entity instance identifiers irrespective of entity type. The summary view 114 indicates that the relationship sets 102-1 and 102-2 identify two unique entity instance identifiers of customer entity type (C1, C2), one unique entity instance identifier of product entity type (P1), and two unique entity instance identifiers of store entity type (S1, S2).

As another example, the relationship icon 116-2 corresponds to the relationship type 2 discussed above (CUSTOMER-PRODUCT), indicated by the information 120-2. Referring to the relationship data structure 100, the subset of the relationship set 102-3 corresponds to the relationship type 2, because the relationship set 102-3 contains non-empty unique entity instance data fields 104-1 and 104-2, and the unique entity instance data field 104-3 is empty. The relationship set 102-3 identifies a total of two unique entity instance identifiers irrespective of entity type (C3, P2). Thus, the summary view 114 indicates that there are a total of two unique entity instance identifiers irrespective of entity type. The summary view 114 indicates that the relationship set 102-3 identifies one unique entity instance identifier of customer entity type (C3) and one unique entity instance identifier of product entity type (P2).

The entity structure icon 118-1 corresponds to the relationship type 6 (PRODUCT), as indicated by the information 122-1. The information 122-1 also indicates that the relationship data structure 100 contains a total of 4 unique entity instance identifiers of the product entity type (P1, P2, P3, P4) in the relationship data structure 100, irrespective of the number of entity structures 22 selected for analysis. The subset of the relationship set 102-7 corresponds to the relationship type 6, because the relationship set 102-7 contains a non-empty unique entity instance data field 104-2, and the unique entity instance data fields 104-1 and 104-3 are empty. The information contained inside the shape that corresponds to an entity structure icon 118-1-118-3 identifies the number of entity instances of the corresponding type of entity that are not identified in any of the types of relationships that correspond to the relationship icons 116-1-116-4. In essence, this number identifies the number of entity instances that do not have any relationship with any other entity instance from the selected group of entity structures 22-1-22-3. For example, the entity structure icon 118-1 corresponds to an entity type of product. Referring to the relationship data structure 100, there is only one entity instance of type product (P4, identified in relationship set 102-7) that is not identified in any of the relationships that correspond to the relationship icons 116-1-116-4. Similar information is illustrated for entity structure icons 118-2 and 118-3, which correspond to a customer type entity and a store type entity, respectively.

Figure 16A:
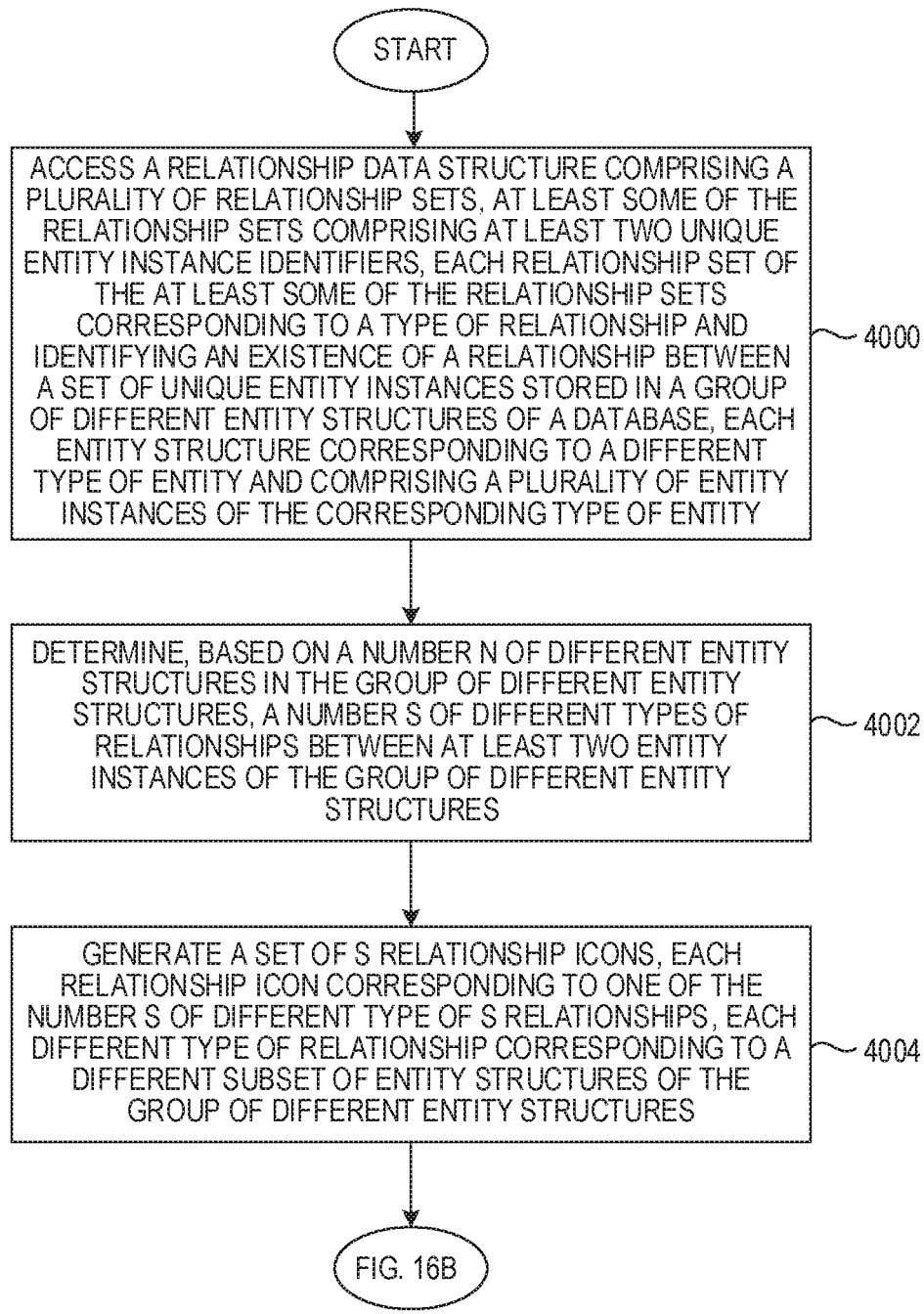
FIGS. 16A-16B illustrate a flowchart for generating an entity relationship summary view according to one embodiment.
Figure 16B:
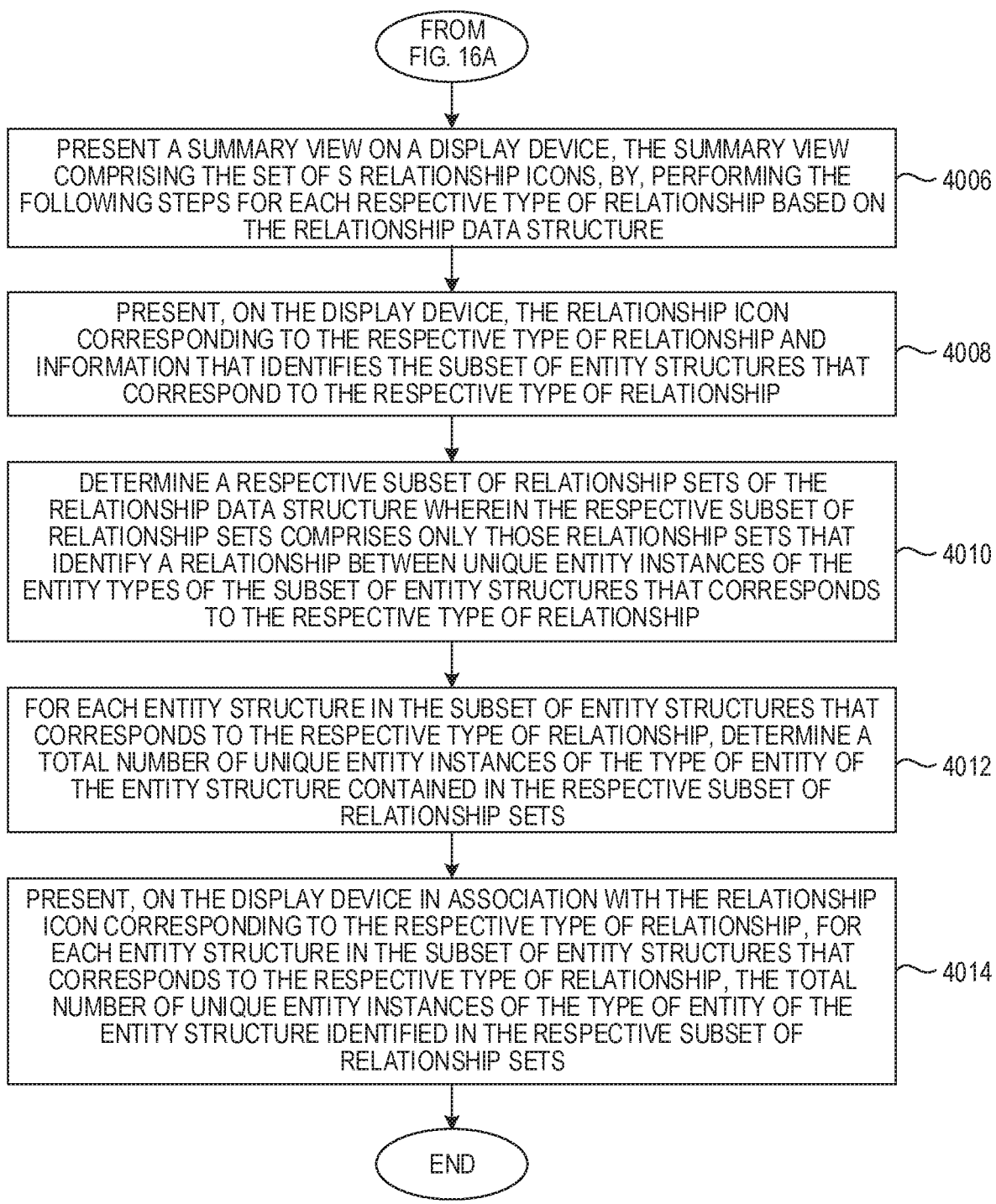

FIGS. 16A-16B illustrate a flowchart for generating the entity relationship summary view 114 according to one embodiment. FIGS. 16A-16B will be discussed in conjunction with FIGS. 13-15. Referring first to FIG. 16A, the computing device 14 may first access the relationship metadata table 108 to determine the meaning of each of the data fields 104-1-104-6 in the relationship data structure 100. In particular, the computing device 14 can determine, based on the entity fields 112-1 of the relationship metadata table 108, that the relationship data structure 100 contains information regarding three entity structures (CUSTOMER, PRODUCT, and STORE). The computing device 14 can determine, based on the fields 112-2 and 112-3 of the relationship metadata table 108, that the data field 104-1 of the relationship data structure 100 contains, if non-empty, a unique entity instance identifier of the customer entity structure 22-3, that the data field 104-2 of the relationship data structure 100 contains, if non-empty, a unique entity instance identifier of the product entity structure 22-1, and that the data field 104-3 of the relationship data structure 100 contains, if non-empty, a unique entity instance identifier of the store entity structure 22-2.

The computing device 14 accesses the relationship data structure 100 which includes the plurality of relationship sets 102-1-102-8, at least some of the relationship sets 102-1-102-8 comprising at least two unique entity instance identifiers. In this example, the relationship sets 102-1-102-5 comprise at least two unique entity instance identifiers. Each of the relationship sets 102-1-102-5 correspond to a type of relationship and identifies an existence of a relationship between a set of unique entity instances stored in the group of different entity structures 22-1-22-3 of a database, each entity structure corresponding to a different entity type and comprising a plurality of entity instances of the corresponding entity type (FIG. 16A, block 4000).

The computing device 14 determines, based on a number N of different entity structures 22 in the group of different entity structures 22-1-22-3, a number S of different types of relationships between at least two entity instances of the group of different entity structures 22-1-22-3 (FIG. 16A, block 4002). In this example, the number S is 4. The computing device 14 generates a set of 4 relationship icons 116-1-116-4, each relationship icon 116-1-116-4 corresponding to one of the different types of relationships, each different type of relationship corresponding to a different subset of entity structures 22-1-22-3 of the group of different entity structures 22-1-22-3 (FIG. 16A, block 4004).

Referring now to FIG. 16B, the computing device 14 presents the summary view 114 on the display device 17, the summary view 114 comprising the set of four relationship icons 116-1-116-4, by performing the following blocks 4008-4014 for each respective type of relationship based on the relationship data structure 100 (FIG. 16B, block 4006).

The computing device 14 presents, on the display device 17, the relationship icon 116-1-116-4 corresponding to the respective type of relationship and the information 120-1-120-4 that identifies the subset of entity structures 22-1-22-3 that corresponds to the respective type of relationship (FIG. 16B, block 4008). The information 120-1-120-4 may be generated, for example, from the data fields 104 in the relationship metadata table 108.

The computing device 14 determines a respective subset of relationship sets 102-1-102-5 of the relationship data structure 100 wherein the respective subset of relationship sets 102-1-102-5 comprises only those relationship sets 102-1-102-5 that identify a relationship between unique entity instances of the entity types of the subset of entity structures 22 that corresponds to the respective type of relationship (FIG. 16B, block 4010).

For each entity structure 22 in the subset of entity structures 22-1-22-3 that corresponds to the respective type of relationship, the computing device 14 determines a total number of unique entity instances of the entity type of the entity structure 22 contained in the respective subset of relationship sets (FIG. 16B, block 4012).

The computing device 14 presents, on the display device 17 in association with the relationship icon 116-1-116-4 corresponding to the respective type of relationship, for each entity structure 22 in the subset of entity structures 22-1-22-3 that corresponds to the respective type of relationship, the total number of unique entity instances of the entity type of the entity structure 22 identified in the respective subset of relationship sets (FIG. 16B, block 4014). The phrase "in association with" as used herein with respect to the presentation of information means that there is some apparent connection between the items, such as, in this case, the relationship icon 116 and the total number of unique entity instances of the entity type of the entity structure 22. The apparent connection can be, for example, the proximity of the two items to one another, the placement of one item on top of or within the other item, such as the presentation of the number of unique entity instances of the entity type of the entity structure 22 within the corresponding relationship icon 116, the use of lines or other connectors that visually connect the two, or any other mechanism for indicating that the two items are associated with one another.

Figure 17A:
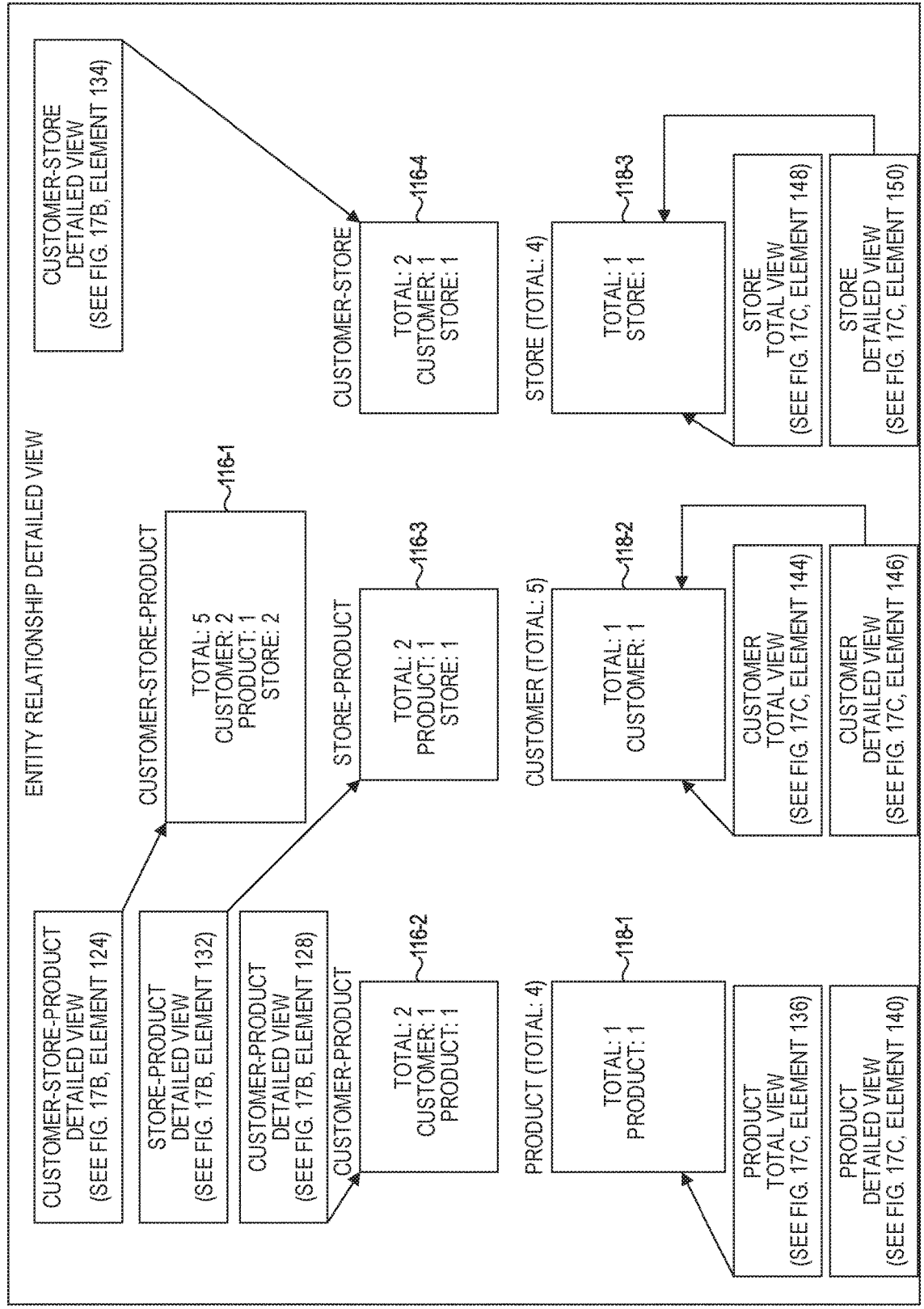

FIGS. 17A-17C illustrate aspects of a detailed view of one or more of the relationship icons 116-1-116-4 and the entity structure icons 118-1-118-3 that may be presented upon request. Mechanisms for requesting such a detailed view are presented below with regard to FIGS. 18A-20. The detailed view presents data contained in the subset of relationship sets 102-1-102-8 that correspond to a respective relationship icon 116-1-116-4 or entity structure icon 118-1-118-3. Due to space limitations, FIG. 17A identifies where on FIGS. 17B and 17C the detailed view for the corresponding respective relationship icon 116-1-116-4 or entity structure icon 118-1-118-3 is located.

As an example, a detailed view 124 associated with the relationship icon 116-1 is illustrated on FIG. 17B. Referring now to FIG. 17B, the detailed view 124 that corresponds to the relationship icon 116-1 is illustrated. The detailed view 124 contains entity names, attribute names, and the information contained in the subset of relationship sets 102-1 and 102-2 that correspond to the relationship icon 116-1. In particular, a row 126-1 contains the entity structure names of the entity structures 22-1-22-3, which were derived from the entity field 112-1 of the relationship metadata table 108. A row 126-2 contains the attribute names of the unique entity instance identifiers identified in the unique entity instance data fields 104-1-104-3 of the subset of relationship sets 102-1 and 102-2, and the attribute names of the attribute data contained in the attribute data fields 104-4-104-6. A row 126-3 contains the unique entity instance identifiers identified in the relationship set 102-1, and the attribute data identified in the relationship set 102-1. A row 126-4 contains the unique entity instance identifiers identified in the relationship set 102-2 and contains the attribute data identified in the relationship set 102-2.

Referring again to FIG. 17A, as another example, a detailed view 128 associated with the relationship icon 116-2 is illustrated on FIG. 17B. Referring now to FIG. 17B, the detailed view 128 that corresponds to the relationship icon 116-2 is illustrated. The detailed view 128 contains entity names, attribute names, and the information contained in the subset of the relationship set 102-3 that corresponds to the relationship icon 116-2. In particular, a row 130-1 contains the entity structure names of the entity structures 22-1 and 22-3, which were derived from the field 112-1 of the relationship metadata table 108. A row 130-2 contains the attribute names of the non-empty unique entity instance identifiers identified in the unique entity instance data fields 104-1 and 104-2 of the subset of the relationship set 102-3, and the attribute names of the attribute data contained in the non-empty attribute data fields 104-4 and 104-5. A row 130-3 contains the unique entity instance identifiers identified in the relationship set 102-3, and the attribute data identified in the relationship set 102-3. A detailed view 132 corresponding to the relationship icon 116-3 is illustrated on FIG. 17B, and a detailed view 134 corresponding to the relationship icon 116-4 is illustrated on FIG. 17B.

Referring again to FIG. 17A, as another example, the entity structure icons 118-1-118-3 may have multiple detailed views. A product total view 136 that corresponds to the entity structure icon 118-1 is illustrated on FIG. 17C. Referring now to FIG. 17C, the product total view 136 contains the entity name, and attribute name associated with each unique product entity instance identifier contained in the relationship data structure 100. In particular, a row 138-1 contains the entity structure name of the entity structure 22-1 (PRODUCT), which was derived from the field 112-1 of the relationship metadata table 108. A row 138-2 contains the attribute name of the unique entity instance identifier contained in the unique entity instance data field 104-2, and the attribute name of the attribute data contained in the attribute data field 104-5, and which corresponds to the unique entity instance data field 104-2 pursuant to the relationship metadata table 108. Rows 138-3-138-6 contain each unique entity instance identifier that identifies an entity instance of the entity structure 22-1 and the corresponding attribute data contained in the relationship data structure 100.

Referring again to FIG. 17A, a product detailed view 140 that corresponds to the entity structure icon 118-1 is illustrated on FIG. 17C. The product detailed view 140 includes information about any product entity instance identified in the relationship data structure 100 that are not identified in any of the types of relationships that correspond to the relationship icons 116-1-116-4. As will be illustrated in FIGS. 19A-19B, this information can vary depending on the particular subset of entity structures 22-1-22-3 that are selected for analysis. Referring now to FIG. 17C, the product detailed view 140 contains the entity name, attribute name, and the information contained in the subset of the relationship set 102-7 that corresponds to the entity structure icon 118-1. In particular, a row 142-1 contains the entity structure name of the entity structure 22-1, which was derived from the field 112-1 of the relationship metadata table 108. A row 142-2 contains the attribute name of the non-empty unique entity instance identifier identified in the unique entity instance data field 104-2 of the subset of the relationship set 102-7, and the attribute name of the attribute data contained in the non-empty attribute data field 104-5. A row 142-3 contains the unique entity instance identifier identified in the relationship set 102-7, and the attribute data identified in the relationship set 102-7.

Referring again to FIG. 17A, similar views 144 and 146 that correspond to the entity structure icon 118-2 are illustrated on FIG. 17C, and similar views 148 and 150 that correspond to the entity structure icon 118-3 are also illustrated on FIG. 17C.

Figure 18A:
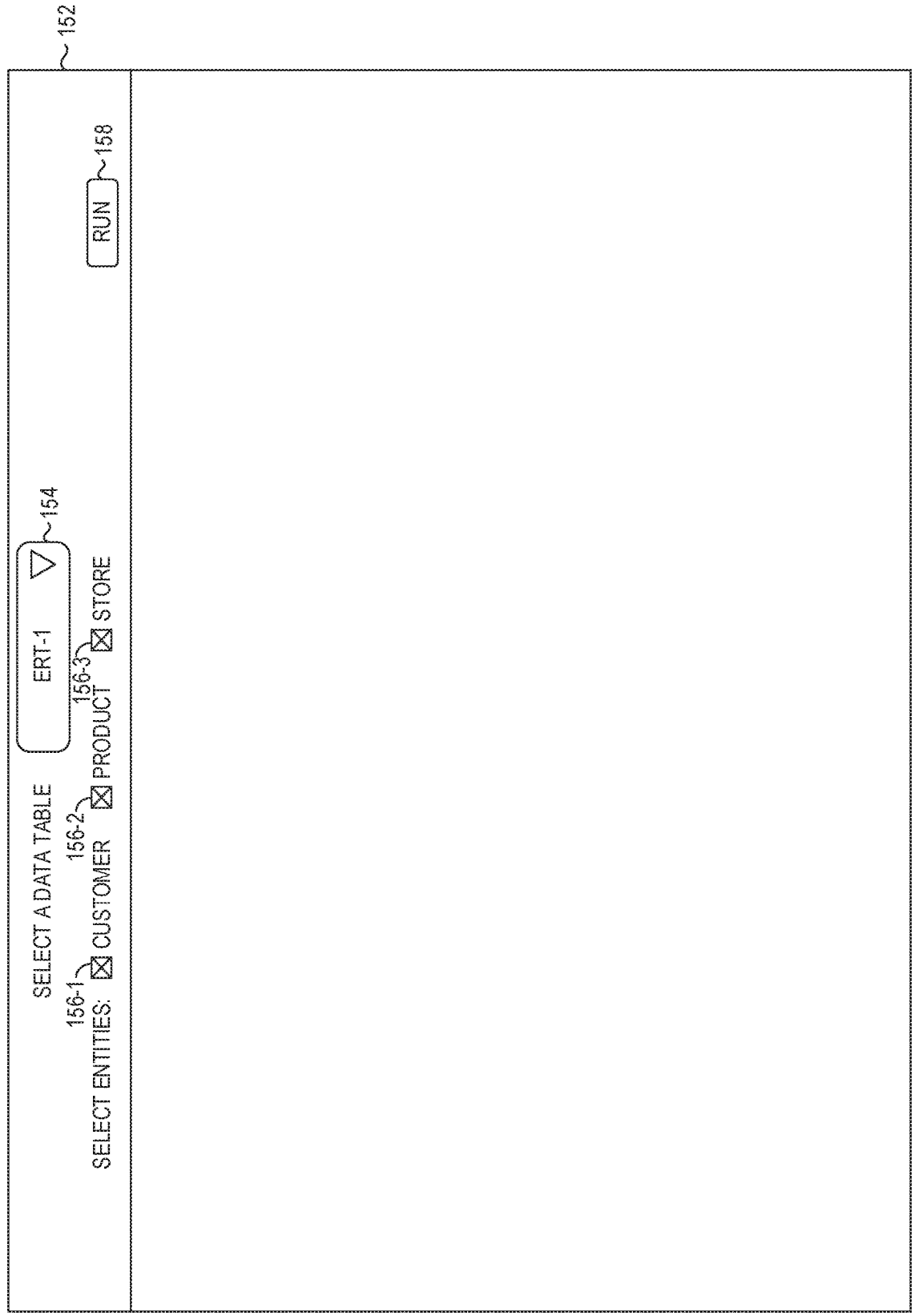
FIGS. 18A-18E illustrate an example user interface and sequence of possible user input actions according to one embodiment.

FIGS. 18A-18E illustrate an example user interface 152 and sequence of possible user input actions according to one embodiment. The user interface 152, among other features, allows the selection of a subset of entity structures 22-1-22-3. Referring first to FIG. 18A, in one embodiment, upon initiation of the entity instance visualizer 12, the entity instance visualizer 12 may determine the existence of one or more relationship data structures 100 and corresponding relationship metadata tables 108. For instance, the entity instance visualizer 12 may access a predetermined location, such as a folder, on a storage device wherein the relationship data structures 100 and corresponding relationship metadata tables 108 are stored, or the entity instance visualizer 12 may be provided runtime information that directs the entity instance visualizer 12 to search an identified folder. In other embodiments, the user interface 152 may allow the user to direct the entity instance visualizer 12 to a particular folder.

The entity instance visualizer 12 generates the user interface 152 and presents the user interface 152 on the display device 17. The user interface 152 at an initial point in time includes a relationship data table control 154 that allows the user to select a particular relationship data structure 100 from a list of relationship data structures 100. In this example, the user selects the relationship data structure 100 illustrated in FIG. 13 ("ERT-1").

In response to the selection of the relationship data structure 100, the entity instance visualizer 12 accesses the relationship metadata table 108, and determines, based on the field 112-1, that the group of entity structures 22 that correspond to the relationship data structure 100 are the entity structures 22-1-22-3, and presents in the user interface 152 three input controls 156-1, 156-2 and 156-3, each of which corresponds to one of the entity structures 22-1-22-3. The user may select one or more of the three input controls 156-1, 156-2, and 156-3. In this example, the user selects each of the three input controls 156-1, 156-2, and 156-3, and then selects a run control 158.

Figure 18B:
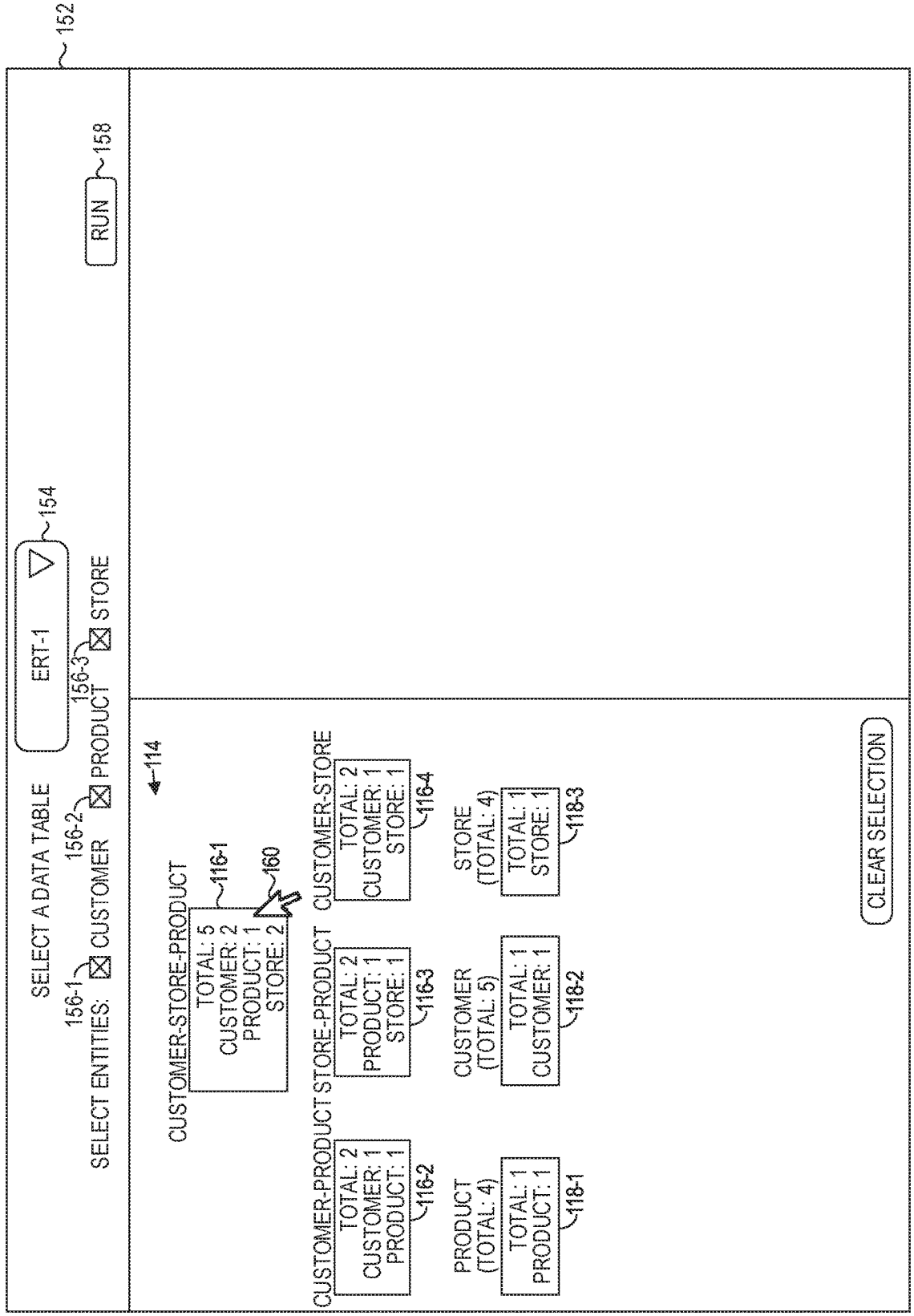

The entity instance visualizer 12 receives the user input that indicates the selection of the three entity structures 22-1-22-3. The entity instance visualizer 12 accesses the relationship data structure 100 and the relationship metadata table 108, and generates the summary view 114 illustrated in FIG. 15 in the manner discussed with regard to FIGS. 16A-16B. Referring now to FIG. 18B, the entity instance visualizer 12 presents the summary view 114 in the user interface 152.

Figure 18C:
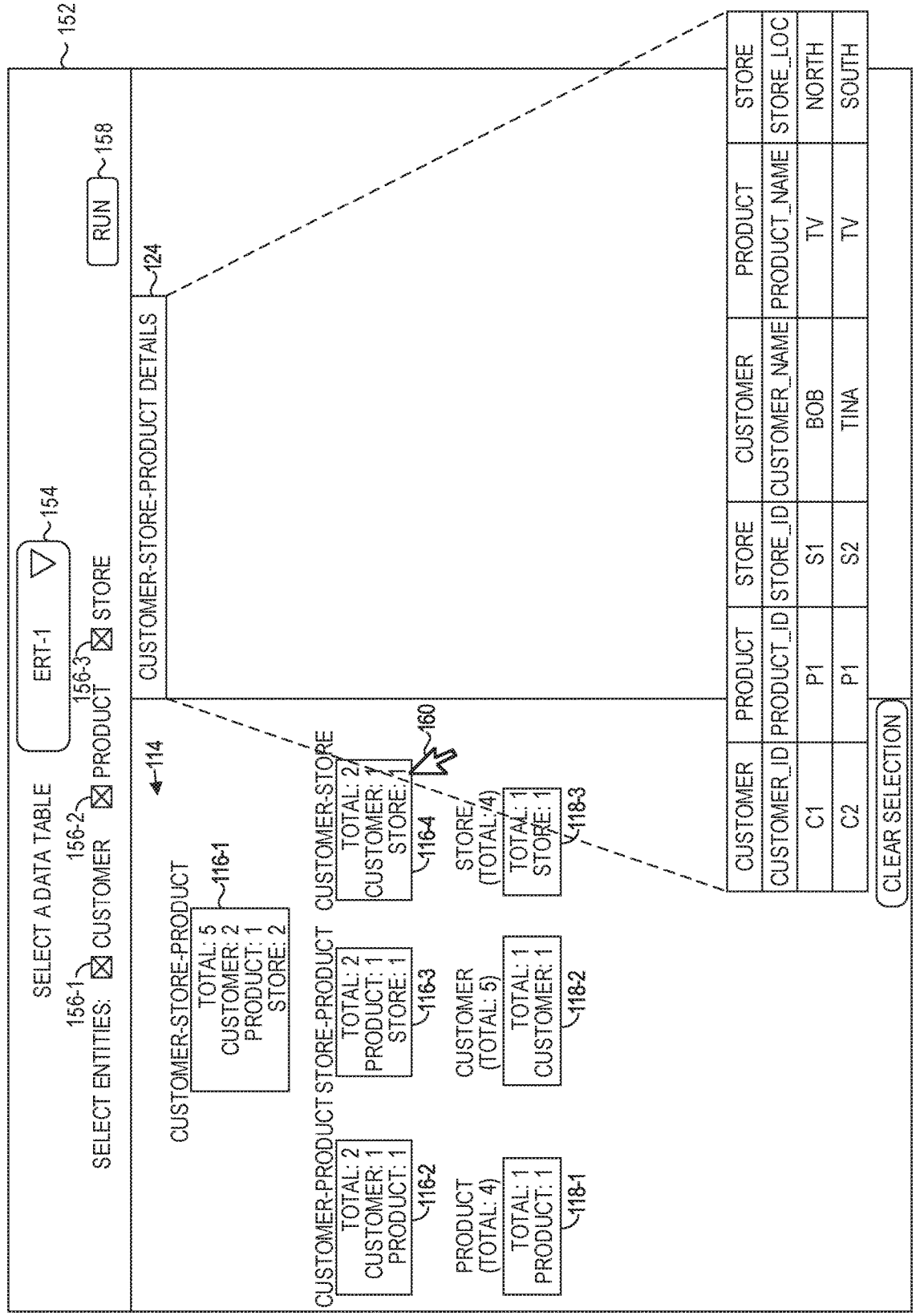
Figure 18D:
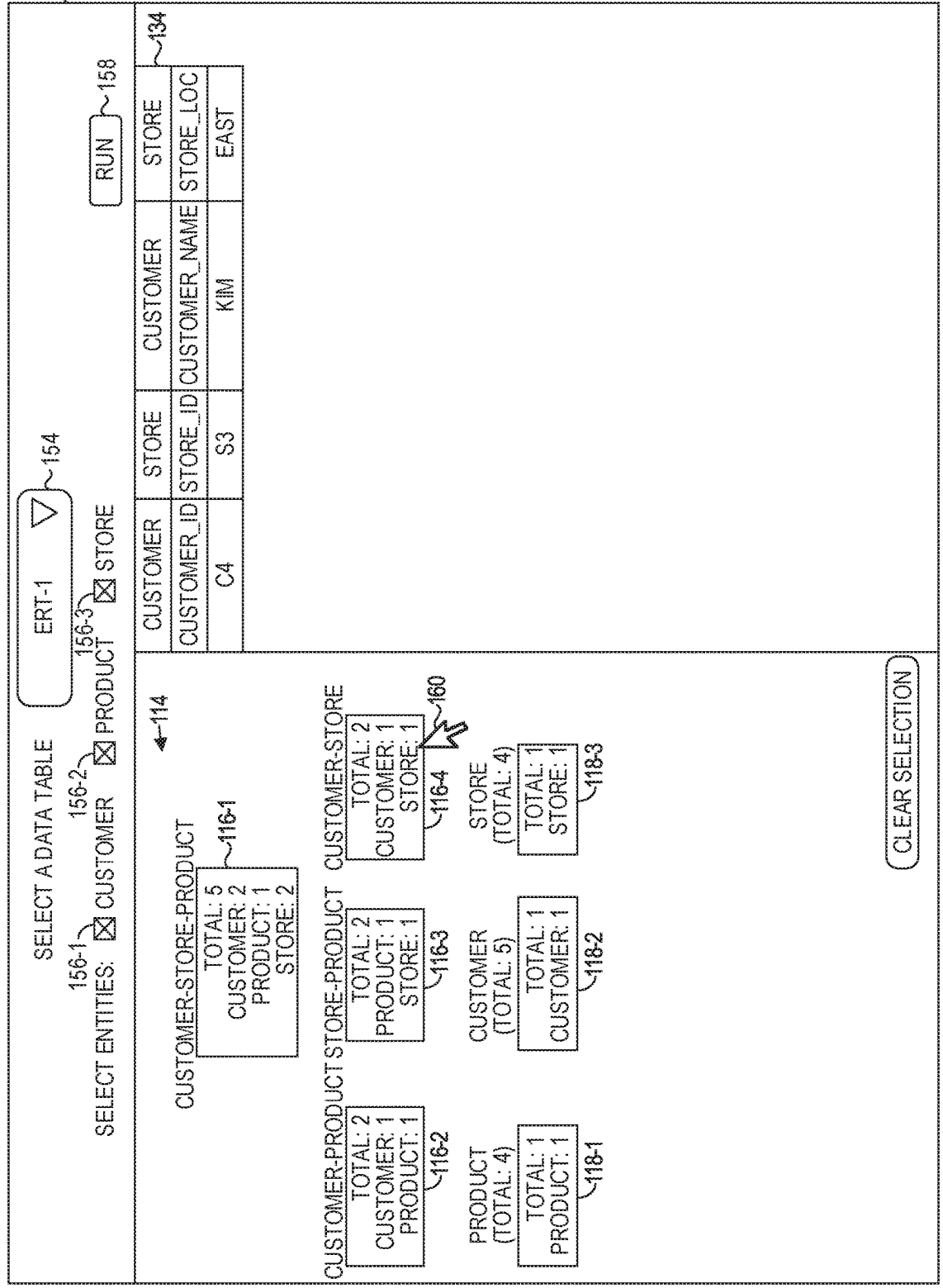

The user then selects the relationship icon 116-1, such as by moving a cursor 160 over the relationship icon 116-1 and activating a mouse selection button. In response, the entity instance visualizer 12 generates the detailed view 124, which corresponds to the relationship icon 116-1, illustrated in FIG. 17B. Referring now to FIG. 18C, the entity instance visualizer 12 presents the detailed view 124 in conjunction with the summary view 114. The user then moves the mouse cursor 160 over the relationship icon 116-4 and selects the relationship icon 116-4. In response, the entity instance visualizer 12 generates the detailed view 134, which corresponds to the relationship icon 116-4, illustrated in FIG. 17B. Referring now to FIG. 18D, the entity instance visualizer 12 presents the detailed view 134 in conjunction with the summary view 114.

Figure 18E:
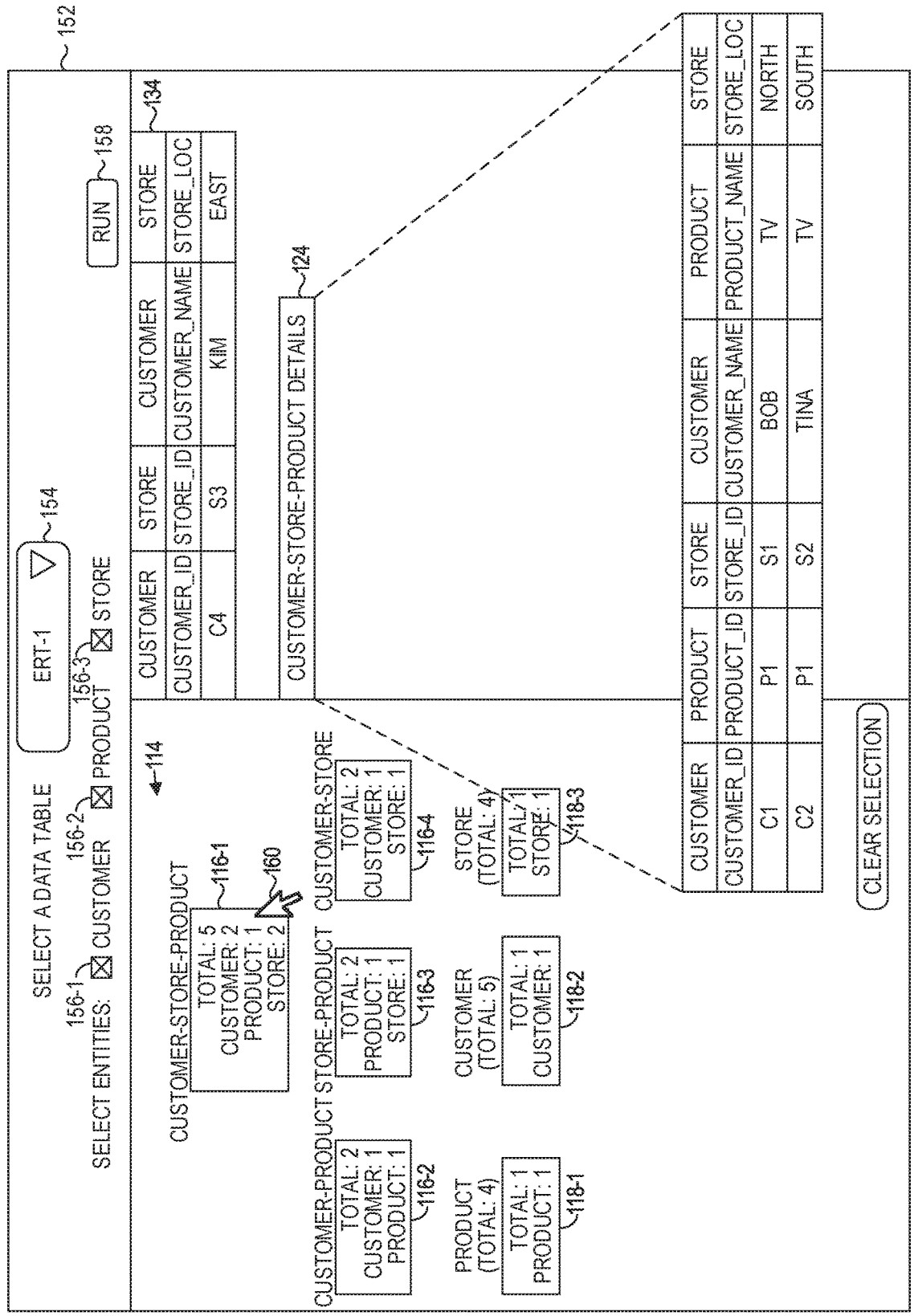

Referring now to FIG. 18E, assume that the user now moves the mouse cursor 160 over the relationship icon 116-1, presses the shift key, and selects the relationship icon 116-1. In response, the entity instance visualizer 12 generates the detailed view 124, which corresponds to the relationship icon 116-1, illustrated in FIG. 17B, and presents the detailed view 124 in conjunction with the detailed view 134 in the user interface 152. In this manner, the user can select one or any combination of multiple relationship icons 116-1-116-4 and/or entity structure icons 118-1-118-3 to concurrently display detailed views that correspond to the relationship icons 116-1-116-4 and/or entity structure icons 118-1-118-3.

FIG. 19A illustrates an embodiment wherein the user selects a subset of entity structures 22-1-22-3. In particular, the user selects only the input controls 156-2 and 156-3 that correspond to the product entity structure 22-1 and the store entity structure 22-2. In response, the entity instance visualizer 12 analyzes the relationship data structure 100 to determine the number of relationship types by disregarding the unique entity instance data field 104-1 that identifies entity instances in the unselected customer entity structure 22-3. In this example, R would be 3 (total number of relationship types based on the formula above), and S would be 1 (total number of relationship types minus the number of entity structures). Based on the unique entity instance data fields 104-2 and 104-3, the entity instance visualizer 12 determines that relationship sets 102-1, 102-2, and 102-4 are relationship sets that identify a relationship between entity instance identifiers of the product entity structure 22-1 and entity instance identifiers of the store entity structure 22-2, irrespective of the content of the unique entity instance data field 104-1. The entity instance visualizer 12 generates a single relationship icon 162 and generates information that identifies the total number of unique entity instance identifiers of product entity instances and store entity instances identified in the subset of relationship sets 102-1, 102-2, and 102-4. In this example, the total number of unique entity instances is five (P1, P3, S1, S2, S3). The entity instance visualizer 12 also determines the total number of entity instance identifiers of product entity instances (2), and the total number of entity instance identifiers of store entity instances (3), identified in the subset of relationship sets 102-1, 102-2, and 102-4. The entity instance visualizer 12 presents the relationship icon 162 and the determined information in the user interface 152.

The entity instance visualizer 12 also generates an entity structure icon 164 and determines the total number of unique product entity instance identifiers contained in the relationship data structure 100 irrespective of the selected entity structures (4). The entity instance visualizer 12 determines the number of unique product entity instance identifiers that are not included in the counts associated with the relationship icon 162. For example, referring to the relationship data structure 100 (FIG. 13), relationship sets 102-1, 102-2, and 102-4 identify relationships between the product entity instances P1 and P3 of the product entity structure and the store entity instances S1, S2 and S3 of the store entity structure. The entity instance visualizer 12 then analyzes the relationship sets 102-3 and 102-5-102-8 and determines that the product entity instances P2 and P4 are identified in the relationship data structure 100 but were not included in the counts associated with the relationship icon 162 because the product entity instances P2 and P4 are product instances that have no relationship with any store entity instance according to the relationship data structure 100. Thus, the entity instance visualizer 12 indicates in the entity structure icon 164 that two such product entity instances exist.

The entity instance visualizer 12 also generates an entity structure icon 166 and determines the total number of unique store entity instance identifiers contained in the relationship data structure 100 (4). Identical to the process described above, the entity instance visualizer 12 determines that only a single store entity instance (S4) was not included in the counts associated with the relationship icon 162, based on the relationship set 102-8. The entity instance visualizer 12 presents the entity structure icon 166 and the determined information in the user interface 152.

The user then moves the mouse cursor 160 and selects the relationship icon 162. In response, the entity instance visualizer 12 generates a detailed view 168 based on the subset of relationship sets 102-1, 102-2 and 102-4.

FIG. 19B illustrates the user selecting a clear selection control 170. In response, the entity instance visualizer 12 clears the detailed view 168 from the user interface 152.

FIG. 20 illustrates an embodiment wherein the user selects only the input control 156-1 that corresponds to the customer entity structure 22-3. In response, the entity instance visualizer 12 analyzes the relationship data structure 100 disregarding the unique entity instance data fields 104-2 and 104-3 that identifies entity instances in the unselected product entity structure 22-1 and the unselected store entity structure 22-2, respectively. Based on the unique entity instance data field 104-1, the entity instance visualizer 12 determines that the subset of five relationship sets 102-1-102-3 and 102-5-102-6 are relationship sets that identify a unique entity instance identifier of the customer entity structure 22-3, irrespective of the content of the unique entity instance data fields 104-2 and 104-3. The entity instance visualizer 12 generates a relationship icon 172 and generates information that identifies the total number of unique entity instance identifiers of customer product entity instances identified in the subset of relationship sets 102-1-102-3 and 102-5-102-6. In this example, the total number of unique entity instances is five (C1, C2, C3, C4, C5). The entity instance visualizer 12 presents the relationship icon 172 and the determined information in the user interface 152.

The user then moves the mouse cursor 160 and selects the relationship icon 172. In response, the entity instance visualizer 12 generates and presents a detailed view 174 based on the subset of relationship sets 102-1-102-3 and 102-5-102-6.

Those skilled in the art will recognize improvements and modifications to the preferred embodiments of the disclosure. All such improvements and modifications are considered within the scope of the concepts disclosed herein and the claims that follow.

What is claimed is:

1. A method comprising:

accessing, by a computing device comprising a processor device, a plurality of relationship sets, each relationship set of the plurality of relationship sets comprising at least two unique entity instance identifiers, each relationship set of the plurality of relationship sets corresponding to a type of relationship and identifying an existence of a relationship between a set of unique entity instances stored in a group of different entity structures of a database, each entity structure corresponding to a different entity type and comprising a plurality of entity instances of the corresponding entity type, each relationship set being established in response to an event associated with things represented by the unique entity instance identifiers identified in the relationship set;

determining, by the computing device based on a number N of different entity structures in the group of different entity structures, a maximum number S of different types of relationships between at least two entity instances of the group of different entity structures;

generating, by the computing device, a set of S relationship icons, each relationship icon corresponding to one of the number S of different types of relationships, each different type of relationship corresponding to a different subset of entity structures of the group of different entity structures; and presenting, by the computing device, a summary view on a display device, the summary view comprising the set of S relationship icons, by, based on the relationship data structure, for each respective type of relationship:

presenting, on the display device, the relationship icon corresponding to the respective type of relationship and information that identifies the subset of entity structures that correspond to the respective type of relationship;

determining a respective subset of relationship sets of the relationship data structure wherein the respective subset of relationship sets comprises only those relationship sets that identify a relationship between unique entity instances of the entity types of the subset of entity structures that corresponds to the respective type of relationship;

for each entity structure in the subset of entity structures that corresponds to the respective type of relationship, determining a total number of unique entity instances of the entity type of the entity structure contained in the respective subset of relationship sets, the total number of unique instances identifying the total number of unique entity instances contained in each entity structure in the subset of entity structures that corresponds to the respective type of relationship; and presenting, on the display device in association with the relationship icon corresponding to the respective type of relationship, for each entity structure in the subset of entity structures that corresponds to the respective type of relationship, information that identifies the entity structure and the total number of unique entity instances of the entity type of the entity structure identified in the respective subset of relationship sets.

2. The method of claim 1 wherein determining, based on the number N of different entity structures in the group of different entity structures, the number S of different types of relationships between at least two entity instances of the group of different entity structures comprises determining, based on the number N of different entity structures in the group of different entity structures, the number S of different types of relationships between at least two entity instances of the group of different entity structures in accordance with the following formula:

$$S = \sum_{r=1}^{N} \frac{N!}{(r!(N-r)!)} - N$$

wherein N is the number of different entity structures in the group of different entity structures.

3. The method of claim 1 further comprising:
based on the relationship data structure, for each respective type of relationship:
presenting, on the display device in association with the relationship icon corresponding to the respective type of relationship, a total number of unique entity instances identified in the respective subset of relationship sets.

4. The method of claim 1 further comprising:
presenting, on the display device, a set of entity structure icons, each entity structure icon corresponding to a different respective entity structure in the group of different entity structures;

determining, for each respective entity structure in the group of different entity structures, a total number of unique entity instances of the entity type of the respective entity structure that are identified in the relationship data structure; and presenting, on the display device in association with each entity structure icon, the total number of unique entity instances of the entity type of the entity structure that are not in any of the S of different types of relationships.

5. The method of claim 1 wherein each relationship set comprises a plurality of unique entity instance data fields, each unique entity instance data field corresponding to a different entity structure in the group of different entity structures, each unique entity instance data field in each relationship set being either empty or non-empty based on the type of relationship that corresponds to the relationship set, wherein each non-empty unique entity instance data field comprises a unique entity instance identifier of an entity instance of the entity structure to which the non-empty unique entity instance data field corresponds.

6. The method of claim 5 further comprising:
accessing a relationship metadata table; and
determining, based on the relationship metadata table, which unique entity instance data fields in each relationship set correspond to which entity structure.

7. The method of claim 5 further comprising:
receiving user input that indicates a first selection of a first selected relationship icon; and
in response to receiving the user input, presenting, on the display device concurrently with the summary view, the entity instance identifiers contained in the subset of relationship sets that corresponds to the respective type of relationship to which the first selected relationship icon corresponds.

8. The method of claim 7 wherein each relationship set further comprises a plurality of attribute data fields, each attribute data field corresponding to a unique entity instance data field in the relationship set, each attribute data field being either empty or non-empty based on the type of relationship that corresponds to the relationship set, wherein each non-empty attribute data field comprises attribute data that describes an attribute of the entity instance identified by the entity instance identifier contained in the unique entity instance data field to which the non-empty attribute data field corresponds.

9. The method of claim 8 further comprising presenting, on the display device concurrently with the summary view, the attribute data contained in the subset of relationship sets that corresponds to the respective type of relationship to which the first selected relationship icon corresponds.

10. The method of claim 7 further comprising:
wherein receiving the user input that indicates the first selection of the first selected relationship icon further comprises:
receiving user input that indicates the first selection of the first selected relationship icon and a second selection of a second selected relationship icon;
in response to receiving the user input,
presenting, on the display device concurrently with the summary view, the entity instance identifiers contained in the subset of relationship sets that corresponds to the respective type of relationship to which the first selected relationship icon corresponds; and presenting, on the display device concurrently with the summary view, the entity instance identifiers contained in the subset of relationship sets that corresponds to the respective type of relationship to which the second selected relationship icon corresponds.

11. The method of claim 7 wherein presenting, on the display device concurrently with the summary view, the entity instance identifiers contained in the subset of relationship sets that corresponds to the respective type of relationship to which the first selected relationship icon corresponds further comprises:

presenting, on the display device, a plurality of rows of information, including:
  a first row that identifies, for each entity structure in the subset of entity structures that correspond to the respective type of relationship, an entity name;
  a second row that identifies, for each entity instance identifier that identifies an entity instance in the subset of entity structures, a name of the entity instance identifier; and
  one or more rows, each of which corresponds to one of the relationship sets in the subset of relationship sets, each of the one or more rows identifying the entity instance identifiers identified in the corresponding relationship set in the subset of relationship sets.

12. The method of claim 1 further comprising:
presenting, on the display device, at least one input control that corresponds to the relationship data structure;
receiving user input that indicates a user selection of the at least one input control; and
wherein accessing the relationship data structure is in response to receiving the user input that indicates the user selection of the at least one input control.

13. A computing device comprising:
a communication interface adapted to communicate with a network; and
a processor device coupled to the communication interface, and configured to:
  access a plurality of relationship sets, each relationship set of the plurality of relationship sets comprising at least two unique entity instance identifiers, each relationship set some of the plurality of relationship sets corresponding to a type of relationship and identifying an existence of a relationship between a set of unique entity instances stored in a group of different entity structures of a database, each entity structure corresponding to a different entity type and comprising a plurality of entity instances of the corresponding entity type;
  determine, based on a number N of different entity structures in the group of different entity structures, a maximum number S of different types of relationships between at least two entity instances of the group of different entity structures;
  generate a set of S relationship icons, each relationship icon corresponding to one of the number S of different types of relationships, each different type of relationship corresponding to a different subset of entity structures of the group of different entity structures; and
  present a summary view on a display device, the summary view comprising the set of S relationship icons, by, based on the relationship data structure, for each respective type of relationship:
    presenting, on the display device, the relationship icon corresponding to the respective type of relationship and information that identifies the subset of entity structures that correspond to the respective type of relationship;
    determining a respective subset of relationship sets of the relationship data structure wherein the respective subset of relationship sets comprises only those relationship sets that identify a relationship between unique entity instances of the entity types of the subset of entity structures that corresponds to the respective type of relationship;
    for each entity structure in the subset of entity structures that corresponds to the respective type of relationship, determining a total number of unique entity instances of the entity type of the entity structure contained in the respective subset of relationship sets, the total number of unique instances identifying the total number of unique entity instances contained in each entity structure in the subset of entity structures that corresponds to the respective type of relationship; and
    presenting, on the display device in association with the relationship icon corresponding to the respective type of relationship, for each entity structure in the subset of entity structures that corresponds to the respective type of relationship, information that identifies the entity structure and the total number of unique entity instances of the entity type of the entity structure identified in the respective subset of relationship sets.

14. The computing device of claim 13 wherein each relationship set comprises a plurality of unique entity instance data fields, each unique entity instance data field corresponding to a different entity structure in the group of different entity structures, each unique entity instance data field in each relationship set being either empty or non-empty based on the type of relationship that corresponds to the relationship set, wherein each non-empty unique entity instance data field comprises a unique entity instance identifier of an entity instance of the entity structure to which the non-empty unique entity instance data field corresponds.

15. The computing device of claim 14 wherein the processor device is further configured to:
access a relationship metadata table; and
determine, based on the relationship metadata table, which unique entity instance data fields in each relationship set correspond to which entity structure.

16. The computing device of claim 14 wherein the processor device is further configured to:
receive user input that indicates a first selection of a first selected relationship icon; and
in response to receiving the user input, present, on the display device concurrently with the summary view, the entity instance identifiers contained in the subset of relationship sets that corresponds to the respective type of relationship to which the first selected relationship icon corresponds.

17. A method comprising:
receiving, by a computing device comprising a processor device, input that identifies a plurality of selected entity structures of a group of entity structures;
accessing a relationship data structure comprising a plurality of relationship sets, at least some of the relationship sets identifying an existence of a relationship between a set of unique entity instances stored in the group of entity structures, each entity structure corresponding to a different entity type and comprising a plurality of entity instances of the corresponding entity type;

determining, based on a number N of the selected entity structures, a number S of different types of relationships between at least two entity instances of the number N of the selected entity structures;

generating a set of S relationship icons, each relationship icon corresponding to one of the number S of different types of relationships, each different type of relationship corresponding to a different subset of entity structures of the plurality of selected entity structures; and presenting a summary view on a display device, the summary view comprising the set of S relationship icons, by, based on the relationship data structure, for each respective type of relationship:

presenting, on the display device, the relationship icon corresponding to the respective type of relationship and information that identifies the subset of entity structures that correspond to the respective type of relationship;

determining a respective subset of relationship sets of the relationship data structure wherein the respective subset of relationship sets comprises only those relationship sets that identify a relationship between unique entity instances of the entity types of the subset of entity structures that corresponds to the respective type of relationship;

for each entity structure in the subset of entity structures that corresponds to the respective type of relationship, determining a total number of unique entity instances of the entity type of the entity structure contained in the respective subset of relationship sets, the total number of unique instances identifying the total number of unique entity instances contained in each entity structure in the subset of entity structures that corresponds to the respective type of relationship; and presenting, on the display device in association with the relationship icon corresponding to the respective type of relationship, for each entity structure in the subset of entity structures that corresponds to the respective type of relationship, information that identifies the entity structure and the total number of unique entity instances of the entity type of the entity structure identified in the respective subset of relationship sets.

18. The method of claim 17 wherein each relationship set comprises a plurality of unique entity instance data fields, each unique entity instance data field corresponding to a different entity structure in the group of different entity structures, each unique entity instance data field in each relationship set being either empty or non-empty based on the type of relationship that corresponds to the relationship set, wherein each non-empty unique entity instance data field comprises a unique entity instance identifier of an entity instance of the entity structure to which the non-empty unique entity instance data field corresponds.

19. The method of claim 18 further comprising:
accessing a relationship metadata table; and
determining, based on the relationship metadata table, which unique entity instance data fields in each relationship set correspond to which entity structure.

20. The method of claim 18 further comprising:
receiving user input that indicates a first selection of a first selected relationship icon; and
in response to receiving the user input, presenting, on the display device concurrently with the summary view, the entity instance identifiers contained in the subset of relationship sets that corresponds to the respective type of relationship to which the first selected relationship icon corresponds.

\* \* \* \* \*